United States Patent [19]
Sonoda et al.

[11] Patent Number: 6,014,453
[45] Date of Patent: *Jan. 11, 2000

[54] COUNTERFEIT DETECTING METHOD AND DEVICE TO GENERATE COUNTERFEIT PROBABILITY DATA AND APPARATUS EMPLOYING SAME

[75] Inventors: Shinya Sonoda; Atsushi Hisano; Masahito Yanagida; Masahiro Akagi, all of Kyoto, Japan

[73] Assignee: Omron Corporation, Kyoto, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/660,409

[22] Filed: Jun. 7, 1996

[30] Foreign Application Priority Data

Jun. 12, 1995 [JP] Japan .................................. P7-144725

[51] Int. Cl.⁷ ...................................................... G06K 9/00

[52] U.S. Cl. ............................................. 382/137; 382/135

[58] Field of Search ................................... 382/135, 137, 382/138, 139, 161, 165, 203; 254/440

[56] References Cited

U.S. PATENT DOCUMENTS

5,216,724   6/1993   Snzuki et al. ............................ 382/135

FOREIGN PATENT DOCUMENTS

0 649 114 A2   4/1995   European Pat. Off. .
0 664 642 A2   7/1995   European Pat. Off. .

*Primary Examiner*—Amelia Au
*Assistant Examiner*—Samir Ahmed
*Attorney, Agent, or Firm*—Dickstein Shapiro Morin & Oshinsky, LLP

[57] ABSTRACT

The invention accurately generates counterfeit probability data indicating that a non-reproducible document is being processed even when the pattern which identifies such documents has been defaced. One set of rules and membership functions is stored in each of three memory sets, for each of (1) an unaltered pattern identifying a non-reproducible document, (2) an altered version of that pattern, and (3) a pattern identifying an ordinary reproducible document. A fuzzy inference unit uses these rules and membership functions to generate data representing the probability that a counterfeiting attempt is occurring. These probability data are transmitted to the copy machine through a control CPU to prevent unlawful copying.

20 Claims, 26 Drawing Sheets

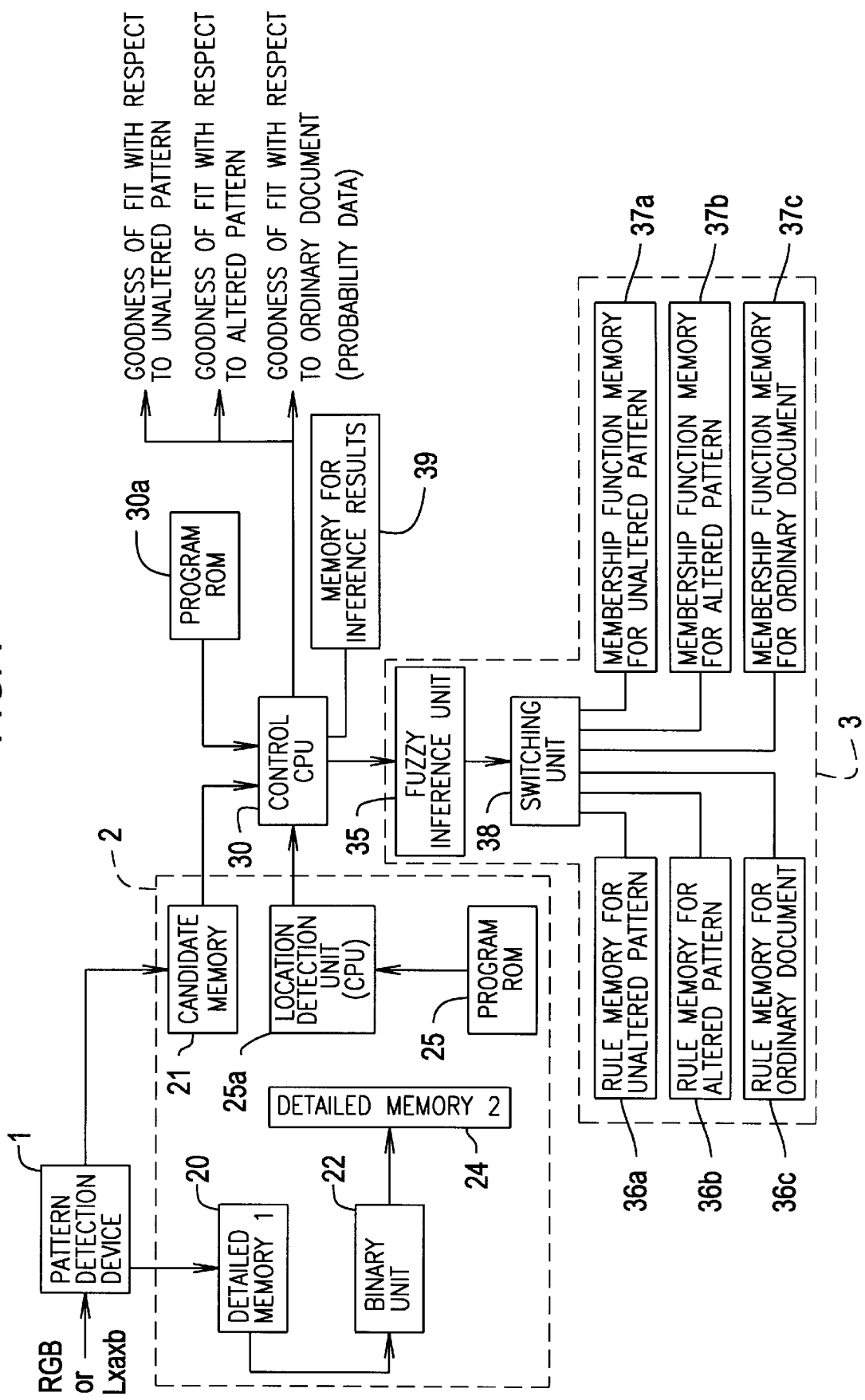

MEMBERSHIP FUNCTIONS

EXAMPLES OF RULES

IF REGION 1 IS INTERMEDIATE,
　　REGION 2 IS INTERMEDIATE,
　　REGION 3 IS HIGH AND
　　REGION 4 IS INTERMEDIATE,
PATTERN IS IDENTICAL TO REFERENCE PATTERN.

GOODNESS OF FIT = (1.0 + 1.0 + 0.6 + 0.7) ÷ 4 = 0.825

MEMBERSHIP FUNCTIONS

EXAMPLES OF RULES

IF REGION 1 IS INTERMEDIATE,
    REGION 2 IS INTERMEDIATE,
    REGION 3 IS HIGH AND
    REGION 4 IS INTERMEDIATE,
    PATTERN IS IDENTICAL TO REFERENCE PATTERN.

GOODNESS OF FIT = (0.6 + 0.4 + 0.3 + 0.2) ÷ 4 = 0.375

MEMBERSHIP FUNCTIONS

EXAMPLES OF RULES

IF REGION 1 IS LOW,
   REGION 2 IS HIGH,
   REGION 3 IS INTERMEDIATE AND
   REGION 4 IS LOW, THEN
PATTERN IS IDENTICAL TO REFERENCE PATTERN.

GOODNESS OF FIT = (1.0 + 0.8 + 1.0 + 0.9) ÷ 4 = 0.925

MEMBERSHIP FUNCTIONS

EXAMPLES OF RULES

IF REGION 1 IS INTERMEDIATE,
   REGION 2 IS INTERMEDIATE,
   REGION 3 IS INTERMEDIATE AND
   REGION 4 IS INTERMEDIATE,
INPUT PATTERN IS IMAGE ON ORDINARY DOCUMENT.

GOODNESS OF FIT = (1.0 + 1.0 + 1.0 + 1.0) ÷ 4 = 1.0

COUNTERFEIT DETECTING METHOD AND DEVICE TO GENERATE COUNTERFEIT PROBABILITY DATA AND APPARATUS EMPLOYING SAME

FIELD OF THE INVENTION

This invention concerns a counterfeit detecting method and device to generate a counterfeit probability data representing the probability that an attempt is being made to counterfeit a document. Such a method and device are installed in a pattern matching device which is a part of an image processing device, and they are useful in preventing the counterfeiting of documents which may not be legally reproduced, such as bank notes and negotiable securities. This is a co-pending application to 08/321,651 filed on Oct. 11, 1994 before the U.S. Patent Office.

BACKGROUND OF THE INVENTION

In recent years, as the capabilities of color copy machines have improved, the counterfeiting of bank notes, negotiable securities and similar documents has become more frequent. This is why these types of color copy machines now have a built-in circuit to generate counterfeit probability data indicating the probability that an attempt at counterfeiting is occurring (hereafter referred to as a "counterfeit detecting device"). These data are generated by comparing a characteristic pattern found in the image which is read (for example, a characteristic mark added to a non-reproducible document or a portion of a pattern which already occurs on the document) to a set of reference patterns. When the counterfeit probability data generated by the device suggest that a counterfeiting attempt is probably occurring, the print output can be controlled in an appropriate way, such as by preventing the reproduction of the document in question or by copying a black screen. In this way, this sort of counterfeiting can be effectively prevented.

Heretofore, the patterns used as references for comparison in this type of device are identical to patterns found on the non-reproducible document. For example, if the pattern on the non-reproducible document is the numeral "0", the reference pattern used for comparison would also be a "0".

However, with this type of prior art device, the fact that the numeral "0" is used as the reference pattern to judge when a counterfeiting attempt is occurring is readily discernable. If the pattern is tampered with until it looked like a "9", a person would not notice anything unusual about the document and a machine would recognize the nine as a completely different numeral. As a result, it would not recognize that the document is non-reproducible and would permit it to be counterfeited.

It might be conceivable to address this problem by broadening the range of concurrence between the pattern on the document and each of the reference patterns. However, this will cause some ordinary documents to be misidentified as non-reproducible, so it is not a convenient solution.

This invention is developed in consideration of the aforementioned problems.

SUMMARY OF THE INVENTION

The object of this invention is to provide a method and device to generate counterfeit probability data representing the probability that an attempt at counterfeiting is occurring which would be able to generate such data without fail when the document is non-reproducible, even if the pattern on it had been tampered with.

Another object of this invention is to provide a copy machine, printer, fax machine or scanner employing such a device which would not execute its normal copying, printing or image data output operation when the document is not reproducible, even if the pattern on it had been tampered with.

The method and device of this invention to generate data representing the probability that an attempt at counterfeiting is occurring are distinguished by the fact that in addition to the characteristic pattern peculiar to the image which may not be reproduced, the set of reference patterns also includes patterns which correspond to the tampering results of tampering with the said characteristic pattern.

The pattern used to distinguish a non-reproducible document might be a special mark which is added to the document or a portion of a pattern which already occurs on the document. If a portion of the pattern itself is used, there is little likelihood that anyone will figure out that this is the pattern being used to judge when an attempt at counterfeiting is being made. Any of a number of well-known methods may be used to extract the characteristic pattern from the image on the document. To give some concrete examples, a pattern in a specified location in the image may be extracted, or, as is suggested by the current applicants in Japanese Patent Publication 6-245064, a pattern resembling a specified pattern may be detected in the image on the document and this pattern may be extracted for comparison with the specified pattern.

It might seem at first that the number of patterns corresponding to the tampering results of tampering with the characteristic pattern in a non-reproducible image would be unlimited. In fact, we can consider that there is only a fixed number of such patterns of tampering results. This is because such non-reproducible documents (bank notes, negotiable securities and the like) must be able to pass a careful visual inspection each time they are circulated. We can thus rule out counterfeiting attempts which entail completely removing or obliterating the characteristic pattern on the document in order to evade mechanical detection. The tampering must be limited to a range of appearances which can evade mechanical detection but which do not arouse suspicion when viewed by the human eye. Most tampering, then, consists of adding additional lines or dots to the characteristic pattern while leaving all or most of its constituent lines and dots alone, as in changing a "0" to a "9". The question of what sort of altered appearance we should anticipate for a particular non-reproducible document can only be answered by considering the specific appearance of that document. The fundamental problem which must be considered is how big the range of alterations is which can fool an electrical eye but will not arouse suspicion when viewed by a human eye.

Next we shall consider the question of what the output data representing the probability of a counterfeiting attempt should include. It is represented in number of types, and depending on the main apparatus which handles the output data (i.e., the copy machine, printer, fax machine or scanner itself).

A first type of the output data for representing the tampering results would be a goodness of fit between the pattern obtained from the document and each reference pattern (the characteristic pattern before tampering and/or characteristic patterns subjected to various forms of tampering) as the data representing the probability of tampering. In this case, every reference pattern would be recorded in, for example, the form of a membership function according to a fuzzy logic inference theory. The data representing the probability of tampering would then be available to the main apparatus in the form of the goodness of fit between the pattern on the document and the unaltered reference pattern and/or the reference patterns which have been tampered with. The probability of a counterfeiting attempt could then be evaluated based on this goodness of fit by using any desired algorithm. This type of output data would have the advantage that it allowed considerable freedom in the design of the main apparatus.

A second type of the output data for representing the tampering results would be, as the data, only the final results of sorting the above goodness of fit by using a given threshold. In this case, the freedom to design an algorithm with which the main apparatus could evaluate the probability of a counterfeiting attempt would be somewhat limited. On the other hand, by setting the threshold at an appropriate level, one could limit the volume of processing which the main apparatus must execute to sort goodnesses of fit to only a portion of what it might be. This would allow the main apparatus to use a simpler control program.

A third type of the output data for representing the tampering results would be to obtain the probability data by plugging into a specified algorithm the results of sorting the goodnesses of fit between the subject pattern and every reference pattern and then solving the algorithm. In this case, the main apparatus would have access to highly reliable probability data obtained by using an algorithm to evaluate the probability of a counterfeiting attempt. Choosing an appropriate algorithm would allow the main apparatus to use a simple control program.

A fourth type of the output data for representing the pampering results would be to use two or more thresholds to sort the goodnesses of fit between the pattern in the received document and the reference pattern in the aforesaid non-reproducible image and/or the patterns corresponding to altered versions of the reference pattern. Then multiple-valued logic can be used to generate the probability data. When the probability data are expressed in this type as numerical values representing the goodness of fit with respect to the reference pattern, there is considerable design freedom for the judging algorithm used by the main apparatus. However, with this type of the output data, it is difficult to avoid using a complicated control program in the main apparatus. When the results of sorting the goodnesses of fit with a single threshold are used as the probability data, the volume of processing which must be executed by the main apparatus to sort the goodnesses of fit can be reduced and the control program in that main apparatus can be simplified. However, a single threshold entails binary logic, so that the results of sorting must be either high or low. If the threshold is not set at the appropriate level, sorting errors will cause non-reproducible documents to be missed and ordinary documents to be flagged. With the fourth type, the goodnesses of fit with respect to the reference pattern can be sorted into at least three levels. The main apparatus could receive the probability data in a form mediated by multiple-valued logic, so that in addition to the two levels we would have if we used the second type described above, namely, (1) high probability that a counterfeiting attempt is occurring and (2) no probability that a counterfeiting attempt is occurring, we would have a third level, (3) some probability that a counterfeiting attempt is occurring. This type would thus allow us get by without having a reference pattern for every type of predicted alteration. We could use a minimum number of altered reference patterns, knowing that documents tampered with in other types would be flagged as "some probability." In response to the data indicating some probability of a counterfeiting attempt, the main apparatus, for example, a copy machine, would execute any of various types of processing on the document presented, such as reducing or enlarging the image, changing the color or changing the density. This would make it possible to produce a copy, albeit an altered copy, of a non-reproducible document, whose letters and shapes would still be recognizable. By the same token, the aforesaid data indicating some probability could be inserted in the judging algorithm when the third type is used. This would enhance the reliability of the probability data obtained. With the fourth type, the goodnesses of fit with respect to the reference pattern could as well be sorted into four or more levels. This could be done, for example, by further dividing the above (3) classification, some probability, into two or more finer classifications.

The next question is what kind of patterns may be used as a reference pattern. In addition to the characteristic pattern peculiar to a non-reproducible document and altered versions of it which are discussed above, the reference patterns may include characteristic patterns peculiar to ordinary images which may legally be copied. It might seem at first that there should be an infinite number of patterns peculiar to ordinary images. In fact, the selection of a characteristic pattern on an non-reproducible document compels the selection of characteristic patterns in ordinary images. For example, let us assume that when we compare a non-reproducible image and an ordinary image, we find that there is a numeral "10" of a specific size and shape just inside a given mark (say, an L-shaped line) in the non-reproducible image only. Let us assume also that it is statistically obvious that the corresponding area in the ordinary image is of uniform density. If we then chose to use this numeral "10" as the characteristic pattern in the non-reproducible image, we would be led to choose the uniformly dense area where the numeral ought to be as the characteristic pattern in the ordinary image. The use of a characteristic pattern peculiar to the non-reproducible image as well as a number of patterns corresponding to various ways of tampering with that pattern significantly improves the reliability of the probability data. The reliability of the probability data will suffer when the appearance of the altered document is different from what is predicted. If the results of comparing the pattern on the received document with the aforementioned characteristic pattern in an ordinary image are used in the data generation process in such a case, this loss in reliability can be offset.

The aforesaid probability data can also include information on how many of the received image data contains the non-producible patterns, or altered version of these whose goodness of fit are more than a given number, or the fact that the received image data contains more patterns than a given number of patterns. As has been stated above, the use of a characteristic pattern peculiar to the non-reproducible image as well as a number of patterns corresponding to various ways of tampering with that pattern significantly improves the reliability of the probability data. However, the reliability of the probability data will suffer when the appearance of the altered document is different from what is predicted. If we consider among all non-reproducible documents (or images) only bank notes and negotiable securities, we can hypothesize that the usual mentality of the counterfeiter would lead him to put a number of bank notes or stock certificates on the glass of the copy machine at the same time and try to make multiple copies of them. In such a case, we would find in the image which is read multiple characteristic patterns peculiar to non-reproducible documents and/or multiple patterns corresponding or nearly corresponding to altered characteristic patterns. By incorporating these data we could offset the loss in reliability of the probability data.

The aforesaid counterfeit detecting device to generate data representing the probability that a counterfeiting attempt is occurring is not limited to use in copy machines. It can also be installed in any apparatus which may be used to counterfeit documents, including a printer, a fax machine and a scanner.

When this is installed in a copy machine, the characteristic pattern contained in the image which is read is compared with the characteristic pattern peculiar to a non-reproducible document and/or to a number of altered version of patterns corresponding to the results of tampering with that pattern. In this way, the data representing the probability of counterfeiting are generated. The print output for the image in question is, then, controlled in an appropriate way according to the data which are generated. For an ordinary document, this control would consist of allowing the normal print output. For a non-reproducible document, it might consist of preventing the print output or printing a black screen. For something which might be a non-reproducible document, it might consist of outputting a print whose size, color, arrangement of dots, or density has been altered. The copy machine thus exhibits an effective capability to prevent counterfeiting even when the characteristic pattern on the document has been altered by hand.

When this is installed in a printer, the characteristic pattern contained in the image which is input is compared with the characteristic pattern peculiar to a non-reproducible document and/or to a number of patterns corresponding to the results of tampering with that pattern. In this way the data representing the probability of counterfeiting are generated. The print output for the image in question is, then, controlled in an appropriate way according to the data which are generated. For an ordinary document, this control would consist of allowing the normal print output. For a non-reproducible document, it might consist of preventing the print output or printing a black screen. For something which might be a non-reproducible document, it might consist of outputting a print whose size, color, arrangement of dots, or density has been altered. The printer thus exhibits an effective capability to prevent counterfeiting not only when the characteristic pattern on the document has been altered by hand, but also when the document has been read by a scanner and altered on a computer screen using editing software.

When this is installed in a fax machine or scanner, the characteristic pattern contained in the image which is read is compared with the characteristic pattern peculiar to a non-reproducible document and/or to a number of patterns corresponding to the results of tampering with that pattern. In this way the data representing the probability of counterfeiting are generated. The output of the image data which have been read is, then, controlled in an appropriate way according to the data which are generated. In the case of a fax machine, this control for an ordinary document would consist of allowing the normal transmission output. For a non-reproducible document, it might consist of preventing transmission or transmitting a black screen. For something which might be a non-reproducible document, it might consist of transmitting a document whose size, color, arrangement of dots, or density has been altered. In the case of a scanner, an ordinary document would be output in normal fashion. For a non-reproducible document, data output would be prevented or a black screen would be output. For something which might be a non-reproducible document, data would be output whose size, color, arrangement of dots, or density had been altered. These sorts of data could be output in normal fashion, or they could be output along with data representing the probability that a counterfeiting attempt is occurring. In the latter case, the function of preventing counterfeiting could be handled by a dedicated computer placed in the printer or between the printer and scanner.

With this invention, a characteristic pattern in the received image is compared with reference patterns to generate data representing the probability that a counterfeiting attempt is occurring. The reference patterns for this comparison include not only the characteristic pattern peculiar to the non-reproducible document, but also a number of patterns corresponding to the hypothetical results of tampering with that pattern. Thus, even if the characteristic pattern on a document has been intentionally defaced, the probability data will not be made to vary.

Various types of data can be used to indicate the probability that a counterfeiting attempt is occurring. These include the goodnesses of fit of the pattern on the document with respect to a set of reference patterns (Type 1); the results of sorting these goodnesses of fit (Type 2); the results of applying the above results obtained by comparing a set of reference pattern in an algorithm to judge the probability of counterfeiting (Type 3); and the results of sorting the goodnesses of fit using multiple-valued logic or the results obtained by applying these results in an algorithm (Type 4). The probability data can also be augmented by (1) using as reference patterns not only the characteristic pattern peculiar to the non-reproducible image and a number of altered versions of that pattern, but also the characteristic pattern peculiar to an image which may legally be reproduced; and by (2) including the information that the received image data contains some or more than a given number of patterns whose goodness of fit with respect to the aforesaid non-reproducible image or to an altered version of it exceeds a given value. This will enhance the integration of the data generating apparatus with the main apparatus which must deal with the data, and it will make the probability data as reliable as possible.

The apparatus in which this invention is employed (copy machines, printers, fax machines and scanners) will be able to prevent counterfeiting without the intervention of any other device. A scanner will output the image data with the counterfeit probability data appended to them, so when the computer or printer executes the requisite processing at a later stage, it can prevent the counterfeiting from proceeding.

DESCRIPTION OF THE DRAWINGS

FIG. 7 is a block diagram of the internal configuration of the pattern extraction and pattern matching devices.

DETAILED DESCRIPTION OF THE INVENTION

In the next section we shall discuss, with reference to the appended drawings, an image processing device 300 which is equipped with a pattern matching device installing the method and device designed according to this invention to generate counterfeit probability data representing the probability that a counterfeiting attempt is occurring. We shall also discuss an ideal embodiment of this invention, a full color copy machine in which this device is employed. The basic thrust of this invention and its distinguishing feature is as follows. Counterfeit probability data representing the probability that a counterfeiting attempt is occurring are generated by comparing a characteristic pattern in the received image with a set of reference patterns. In addition to the characteristic pattern peculiar to the non-reproducible document, the aforesaid set of reference patterns also includes a number of characteristic patterns corresponding to the hypothetical results of tampering with that pattern.

There are a number of well-known methods which may be used to extract the characteristic pattern from the image data which are received. The one used in this embodiment is proposed by the current applicants in Patent Publication 6-245064. With this method, the characteristic pattern (i.e., the pattern which is to be compared) on a portion of the document is focused on regardless of the size (the outer dimensions) of the entire document. Detection consists of determining whether or not there is a characteristic pattern in that location. This method requires a relatively small memory capacity, and it reduces the cost of the device. All processing from detecting the pattern to evaluating degree of similarity is done in real time on a single scan. It boasts a high recognition rate without significant misses even in single scan-type copy machines. Various other advantages are discussed in claim 13, line 24 through claim 14, line 25 of the same publication.

Figure 1:
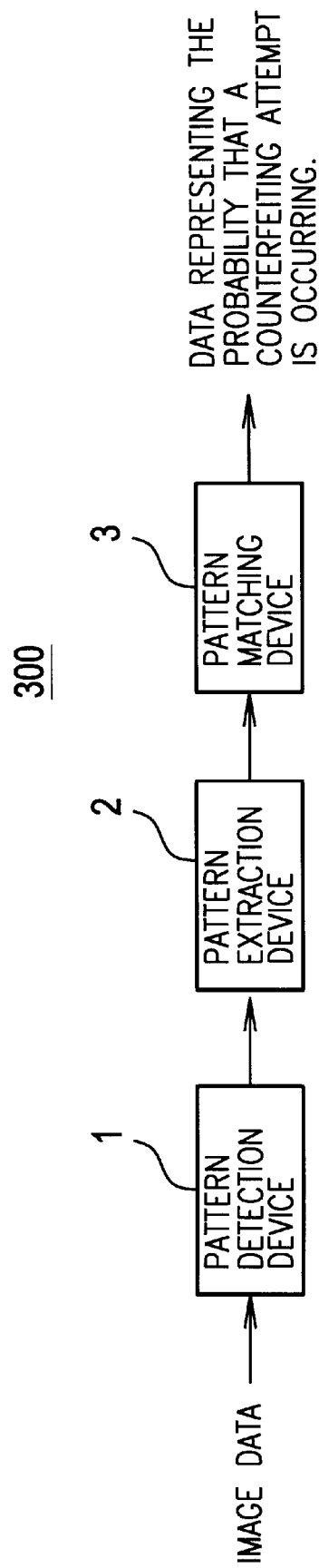
FIG. 1 is a block diagram showing the overall configuration of an image processing device according to this invention in which a counterfeit probability data that a counterfeit attempt is occurring is installed in the pattern matching device.

As is shown in FIG. 1, the image data read by the image sensor in the copy machine are input into pattern detection device 1, the device which detects the characteristic pattern (i.e., the pattern to be compared) and which constitutes the first stage of image processing device 300. These image data are transmitted in real time, region by region, while the scan, a CCD image scan or the like, is in progress. The actual data are full color data representing the red (R), green (G) and blue (B) components with a resolution of 400 DPI.

Pattern detection device 1, the first stage of image processing device 300, attempts to match a pattern consisting of a mark or shape of a given size against a gradated image generated by condensing the image data which have been input. It checks every area for the presence of patterns which are likely candidates for a match with the specified pattern, a mark or figure which is the characteristic pattern on the non-reproducible document. When it has detected such a candidate, it specifies a rough reference location for it (the center for a circle, the apex of a corner for a rectangle). The location data are transmitted to pattern extraction device 2, the next stage, as the results of the rough search.

Using the non-compressed image data containing the candidate detected in the aforesaid rough search, pattern extraction device 2 detects more precisely the roughly specified reference location. It also creates a characteristic pattern to be used in the pattern matching performed to generate the probability data in a later process. Pattern extraction device 2 has a specified memory unit in which candidates for matches can be stored temporarily. Device 2 also uses the detailed, non-compressed image to render a preliminary judgment as to whether the candidate pattern resembles the target pattern. If it judges that the candidate does resemble the pattern being sought, it will extract the pattern in a given portion of the surrounding area based on the aforesaid reference location. It will then transmit this pattern to pattern matching device 3, which makes use of the method and device of this invention.

Pattern matching device 3 uses fuzzy pattern matching to obtain the goodness of fit of the extracted pattern with respect to the reference pattern. It generates this goodness of fit and outputs it as the probability data to the copy machine (PPC).

In this embodiment, the image data read by an ordinary copy machine are matched against a pattern created by gradating a reference pattern in order to compare swiftly. Successive rough searches are then conducted by comparing the patterns, and patterns which resemble the reference pattern are extracted. When a number of candidates have been detected, the data associated with these patterns are stored in the storage unit and processed successively in a specific fashion. The patterns are then matched using fuzzy logic, and the goodnesses of fit (the probability data) are generated. In other words, a rough search is performed using a compressed image before device 3 performs pattern matching using a detailed image which is relatively close to the original. (Because the rough search is based on gradated image data, matches can be judged swiftly and accurately.) This arrangement allows the processing required for pattern matching to be performed at high speed. The processing entailed by reading the image or performing a rough search can be executed simultaneously with any other process. There is thus no need to temporarily interrupt the other processing while the goodnesses of fit are calculated. The entire process can be executed in real time at high speed.

We shall next discuss the actual configuration of each part of the aforesaid image processing device. Pattern detection device 1, which detects a characteristic pattern, is pictured as a block diagram in FIG. 2. Here we see that the image data are sent to averaging unit 10, where a specified number of neighboring pixels in the relevant data are combined to form larger units. The density of the pixels in each unit is averaged to create a gradated image consisting, as it were, of rather larger pixels.

Figure 3:
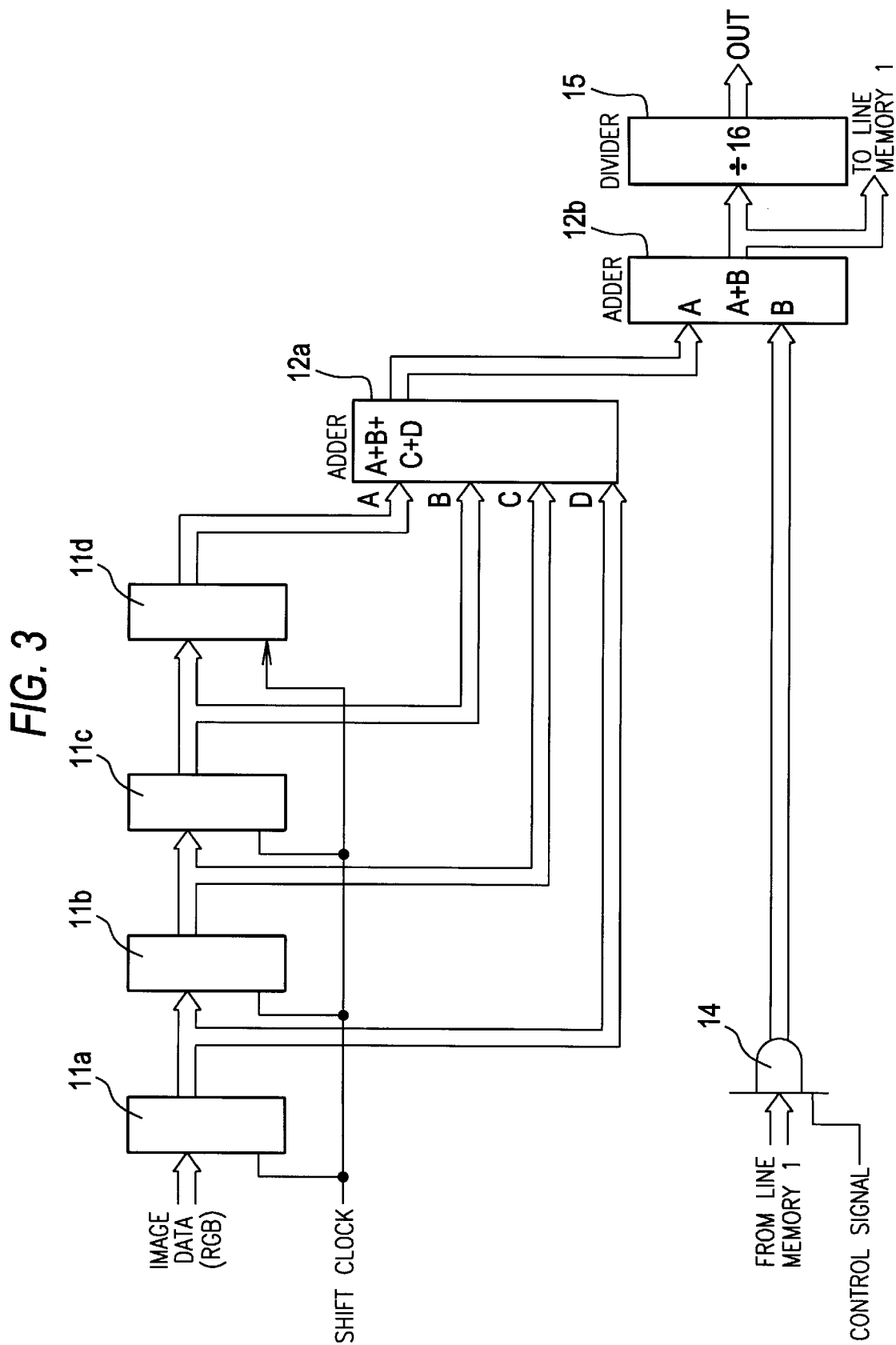
FIG. 3 is a block diagram of the internal configuration of the averaging unit in the pattern detection device.

Averaging unit 10 might comprise the components shown in the block diagram in FIG. 3. Each output from latches 11a through 11d, which are connected in four stages that sequentially output data synchronized by a shift clock, is input into adder 12a. Each pixel in each line of the image data is input, in sequential order, into input terminals A, B, C and D of latch 11a. Each pixel is represented as multivalued data which express its density (or gradation of brightness). Thus in each of latches 11a through 11d, a specified number of bits is set which correspond to these multivalued data.

The first adder, 12a, adds the four values which represent the densities of the pixels stored in latches 11a through 11d, which are the last four pixels to have been input (the last four pixels on the path which is being scanned), and transmits the result to the second adder, 12b, through input terminal A. The sum of the densities of specified pixels in the last three lines, which are stored in the first line memory 13, is input into input terminal B of adder 12b via gate circuit 14. The result of the addition performed by adder 12b is sent to both the aforesaid line memory 13 and to divider 15.

The output of adder 12b is written into line memory 13 each time four pixels have been added, in response to a control signal which is not pictured in the diagram. In other words, the first through fourth pixels on the line being processed are input simultaneously into adder 12a. Based on the result of the addition performed by adder 12a, further addition is performed by adder 12b, after which the first write-in of data into line memory 13 is performed. When the fifth through eighth pixels have been added, the result is input into memory 13 in the second write-in. This procedure is performed repeatedly. In this way, the result of the addition of every four pixels on line 1 is stored in order in line memory 13.

When line 2 is processed, the result of adding every four pixels is obtained from latches 11a through 11d and adder 12a just as with line 1; at the same time, however, previous results of addition which are stored in line memory 13 are read out, and adder 12b adds the results obtained by adding every four pixels on line 2 to the corresponding results for every four pixels on line 1. In this way the densities of eight pixels, four of which are contiguous to the other four in each of two rows, are added together; the result of this addition is stored in line memory 13.

When line 3 (or line 4) is processed, the totals of the densities of certain pixels in lines 1 and 2 (or lines 1 through 3), which are obtained by the addition performed during the processing of the previous lines and stored in line memory 13, are added to the corresponding densities in the current line. When line 4 is processed, the result of the addition performed by adder 12b (the total of the densities of 4×4, or 16, pixels) is sent to divider 15, where it is divided by 16 to obtain an average density value. The control signal which is input into gate circuit 14 goes to zero once line 4 has been processed. Readout of data from line memory 13 is prohibited and the cumulated value is reset.

By increasing or decreasing the number of latches, we can increase or decrease the number of pixels whose density is averaged. Increasing the number of latches will produce an image with lower resolution. By varying the number of latches and choosing an appropriate timing for the input of the control signal (0) to gate circuit 14, we can obtain an average density for N×M pixels. Which conditions are appropriate will depend on the image to be matched (or detected).

The average density of each sixteen pixels is used to construct an image consisting of new, larger pixel units. The data concerning this new image are sent to binary processor 16, where at a certain threshold density they are converted to binary values. The resulting binary image is stored temporarily in multiple-line memory 17. This generated image is more blurry than the original image. Details of the original patterns in the image have been lost, and only rough shapes can be discerned. By setting an appropriate threshold for the conversion to binary, we can produce an image in which the interior of a given pattern, such as the corner or one of the markings on a bank note (in the case of a bank note), will appear totally black while the background is totally white. Even if a misregister or other printing error in the original image as read out and input results in a slight discrepancy between the specified pattern which is stored and the pattern which is being checked, the discrepancy will vanish when the image is gradated. This method allows the image to be detected simply and quickly.

The output from the aforesaid binary processor 16 is sent to search unit 18, where the gradated image with low resolution (actually, the binary data) is searched for a pattern of a given shape. That is to say, a search is made for a specified pattern in a region of a given size, such as a mask with dimensions N×N. This search will be explained in concrete fashion below.

Figure 2:
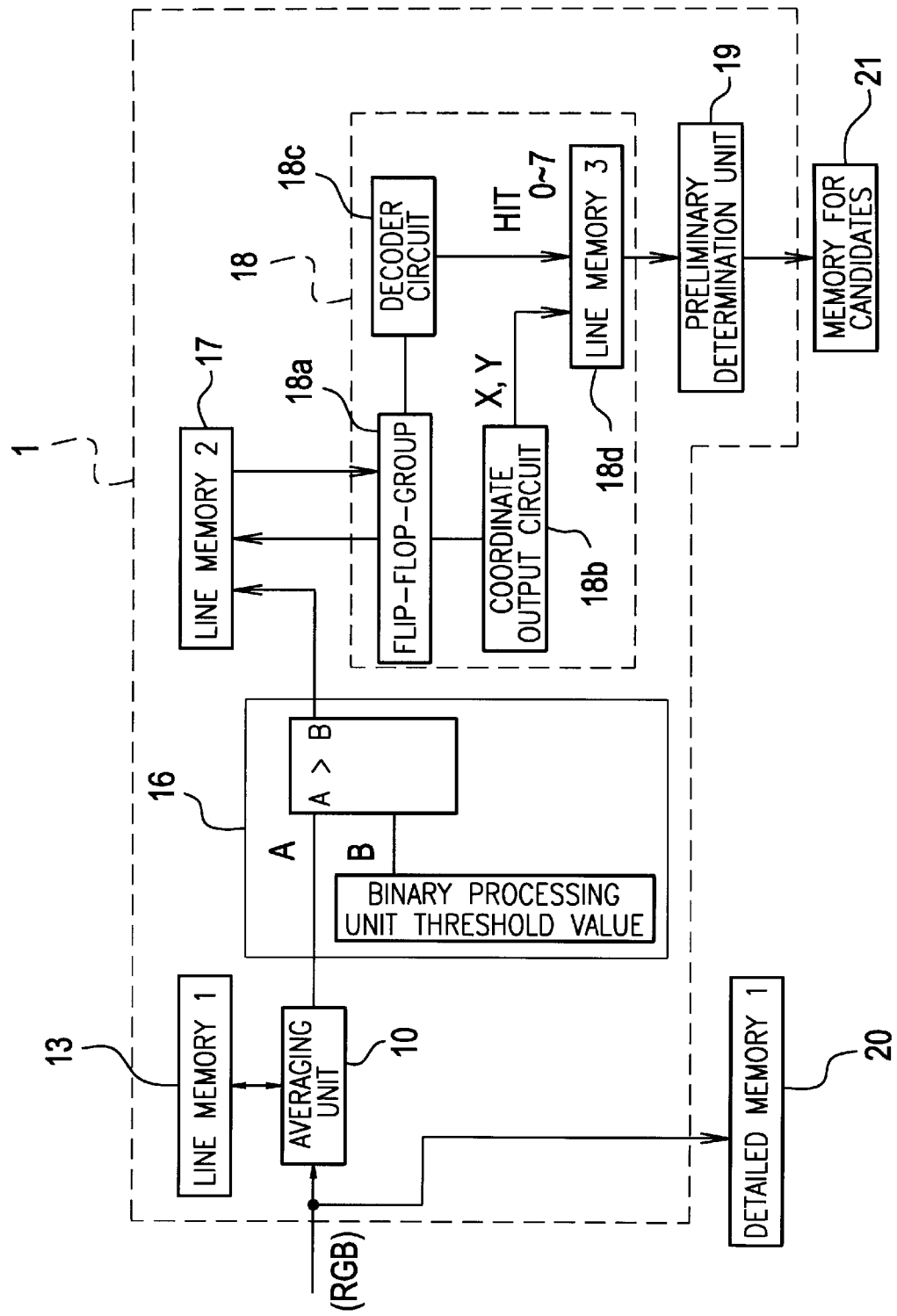
FIG. 2 is a block diagram of the internal configuration of the pattern detection device.

Search unit 18, shown in FIG. 2, is composed of flip-flop group 18a; coordinate output circuit 18b, which receives the output from flip-flop group 18a, obtains the point coordinates of the hits which indicate the positions of patterns representing possible matches, and outputs those coordinates; decoder circuit 18c, which specifies the orientation and other features of the patterns; and third line memory 18d, in which are stored the data representing detected patterns which are possible matches.

Figure 4:
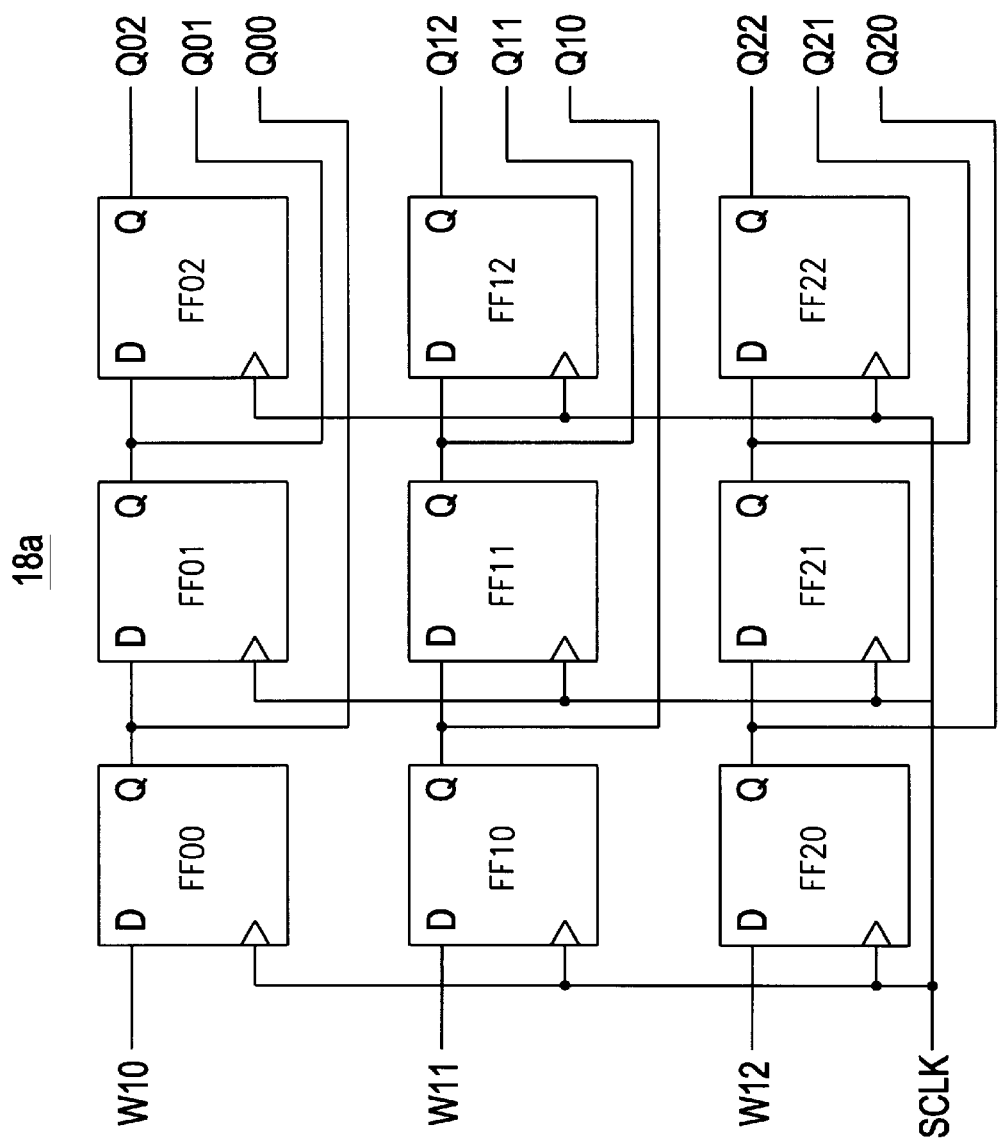
FIG. 4 is a block diagram of the internal configuration of the flip-flop group in the pattern detection device.

The actual arrangement of flip-flop group 18a is shown in FIG. 4. In this example, the area being processed consists of 3 pixels of scanning×3 pixels of feed, or 9 (3×3) flip-flops FF. The three pixels W10, W11 and W12, which are in line in the feed orientation, are taken from the image data stored in second line memory 17, synchronized by means of the shift clock SCLK, and input to the first column of flip-flops, F00, F10 and F20. New pixel data are input to W10, W11 and W12 sequentially according to timing provided by the shift clock, and the data are transmitted to the next column of flip-flops. The pixel data which are input for the binary image, QQ0, Q01, Q02, Q10, Q11, Q12, Q20, Q21 and Q22, are output through the output terminal Q on each flip-flop. For a black pixel, the output of the flip-flop will be "1".

When all scanning data up to the end of one line have been input, the device shifts down one line in the direction of feed and inputs data from the beginning of that line. Thus scanning the 3×3 pixel area (the mask) which is the domain of the search is equivalent to moving over the surface of the document.

Figure 5:
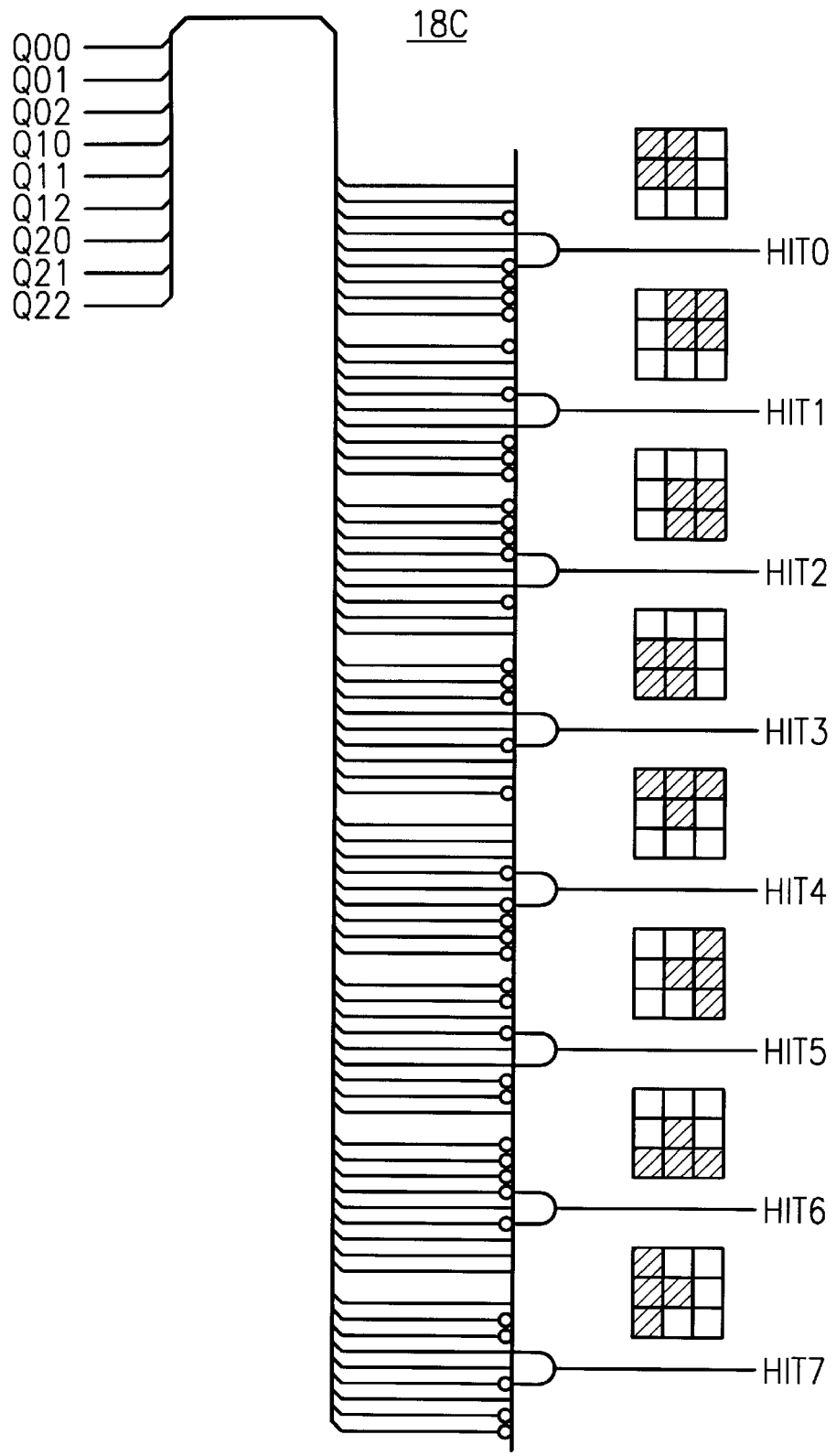
FIG. 5 is a block diagram of the internal configuration of the decoder circuit in the pattern detection device.

Each of the aforesaid outputs, Q00, Q01, Q02, Q10, Q11, Q12, Q20, Q21 and Q22, is input into decoder circuit 18c. Decoder circuit 18 is pictured in FIG. 5. If the pattern of 3×3 pixels which is output by flip-flop group 18a is one of the eight patterns (Hit 0 to Hit 7), the output of the corresponding AND element will go high. If the output from decoder circuit 18c for Hit 0 goes high, we know that there is a dark area in the top left-hand corner of the grid, centered around flip-flop FF11. If the output for Hit 4 goes high, we know that there is a dark area covering the upper part of the grid, centered around flip-flop FF11. In this example, the object of the search is a corner. Therefore, patterns other than these eight, such as when the central pixel is in the middle of a border or within or outside a dark area, will not be detected.

Coordinate output circuit 18b is connected to the addresses in multiple line memory 17. It outputs to flip-flop group 18a the addresses of images which must be input, and it outputs to line memory 18d the coordinates (XY) of the pixels output by FF11, the central flip-flop in group 18a. The output of decoder circuit 18c and the central coordinates XY at that moment are stored in line memory 18d. The detection results for several lines worth of data are also stored in third line memory 18d. In this example, nine flip-flops representing 3×3 pixels are used to detect the corner of a figure; the states of the decoder circuit are those shown in the diagram. However, the number of flip-flops used and the conditions for the decoder must be selected according to the shape of the pattern one wishes to detect and which portion of it one chooses to focus on. It would, of course, be possible to detect a circle or some other shape as required.

Numerous data which do not need to be sent to the device handling the next stage of the process, pattern extraction device 2, are stored in third line memory 18d in search unit 18, which consists of hardware. For this reason, all the data in line memory 18d are sent to preliminary judgement unit 19, which judges whether they need to be processed by extraction device 2. (This consists of pulling out the hit points.)

In this example, a rough search is performed with reference to gradated data. This allows image data which potentially have the specified pattern to be identified swiftly and surely as possible matches. At the same time, a large quantity of useless data are also detected. When the states of the pixels on the periphery lead to the judgement that a given pattern is not the specified pattern, that pattern can be eliminated without being output, obviating the need for subsequent more detailed judgements. Only the actual hit points are output to memory 21 in pattern extraction device 2.

To process this judgement, data stored in third line memory 18d for which the output goes high (the hit points) are extracted, and effective hit points are detected based on the relative spatial relationships among these hit points and other hit points which are on their periphery. The position coordinates XY and the orientation data for these points, HIT 0 to HIT 7, are stored in memory for candidates 21.

Figure 6A:
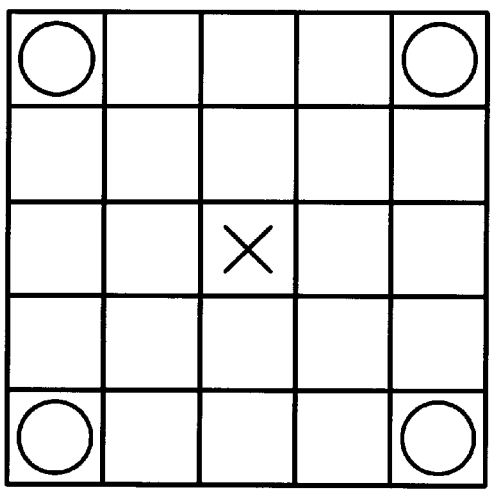
FIG. 6 illustrates the operation of the preliminary judgement unit in the pattern detection device.
Figure 6B:
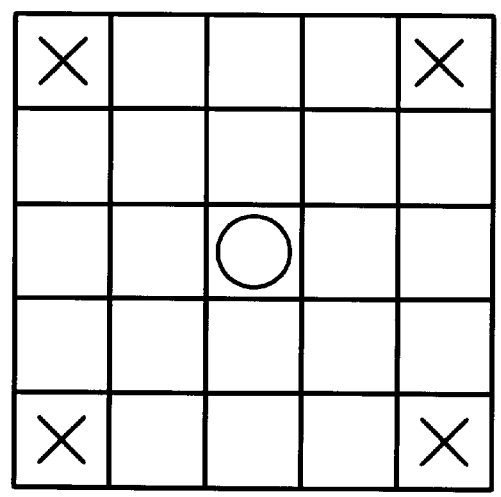

To give one example, depending on the type of pattern being sought (its shape, size, etc.), if there is another hit point in the vicinity of a hit point which has been detected, or within a specified area around that hit point, then the first hit point will be regarded as valid. If a number of hit points are found within a specified area, then an appropriate decision will be made, depending on the pattern, to consider only the periphery (FIG. 6 (A)) or only the center (FIG. 6 (B)).

In the example discussed above, when a specified number of pixels from the image data are averaged to create a gradated image, the resolution is altered to a specified level in a single operation. It would alternatively be possible to alter the resolution gradually using a series of operations.

FIG. 7 is a block diagram illustrating the circuits peripheral to pattern extraction device 2. As shown in the figure, device 2 continuously stores in first detailed memory 20 the RGB data (the variable density image) from detection device 1 which have not yet been converted to binary values. First detailed memory 20 has a sufficient capacity to allow it to maintain storage of image data from the pixels (or the line) currently read by the image sensor to a specified earlier point (at least as large as the pattern to be detected). If its capacity is reached, the oldest data (those acquired earliest) are erased and new data are written in their place.

As is described earlier, the coordinate values and orientation of valid hit points output by preliminary judgement unit 19 in detection device 1 are written into memory 21. The stored coordinate values are read out by CPU 30. This CPU sends various control signals to extraction device 2, thus controlling its operation. One such control signal is the command sent to first detailed memory 20 telling it to output, based on the coordinate values read out from memory 21, the image data which contain the pattern associated with a valid hit point.

Based on the coordinates read out by CPU 30, the corresponding image data stored in first detailed memory 20 are sent to binary unit 22. Here the RGB image data are converted to binary values; however, the threshold value for this conversion need not be the same as that used by binary processor 16 in the aforesaid pattern detection device 1. Since the primary objective in device 1 is to detect the presence of possible matches to the specified pattern, the threshold is set at a level which basically rendered the interior of the pattern entirely dark. The threshold used by device 2 is set so as to extract more accurate hit points (specified positions) and exhibit a detailed mosaic which reveals the characteristics of the detected pattern so that pattern recognition can be performed at a later stage.

The binary data produced in this fashion are stored temporarily in second detailed memory 24 and sent in order to position detection unit (CPU) 25. Here reference points are obtained for the matching operation to be performed in matching device 3. Based on data stored in program ROM 25*a*, which is connected to CPU 25, a certain specified position in the specified pattern to be detected is obtained. For a corner, this position is the accurate location of the apex, and for a mark, the accurate location of the center.

In other words, position detection unit 25 operates in fundamentally the same way as preliminary judgment unit 19, which is described above. It performs the processing which is appropriate for a pattern which is a corner or a mark, and it obtains a specified position within that pattern, which is the accurate location of the apex for a corner and the accurate location of the center for a mark. If when position detection device 25 extracts this accurate position and it judges that this candidate is not the specified pattern to be detected, output will cease. Specific details for searching a corner are given below.

Figure 8:
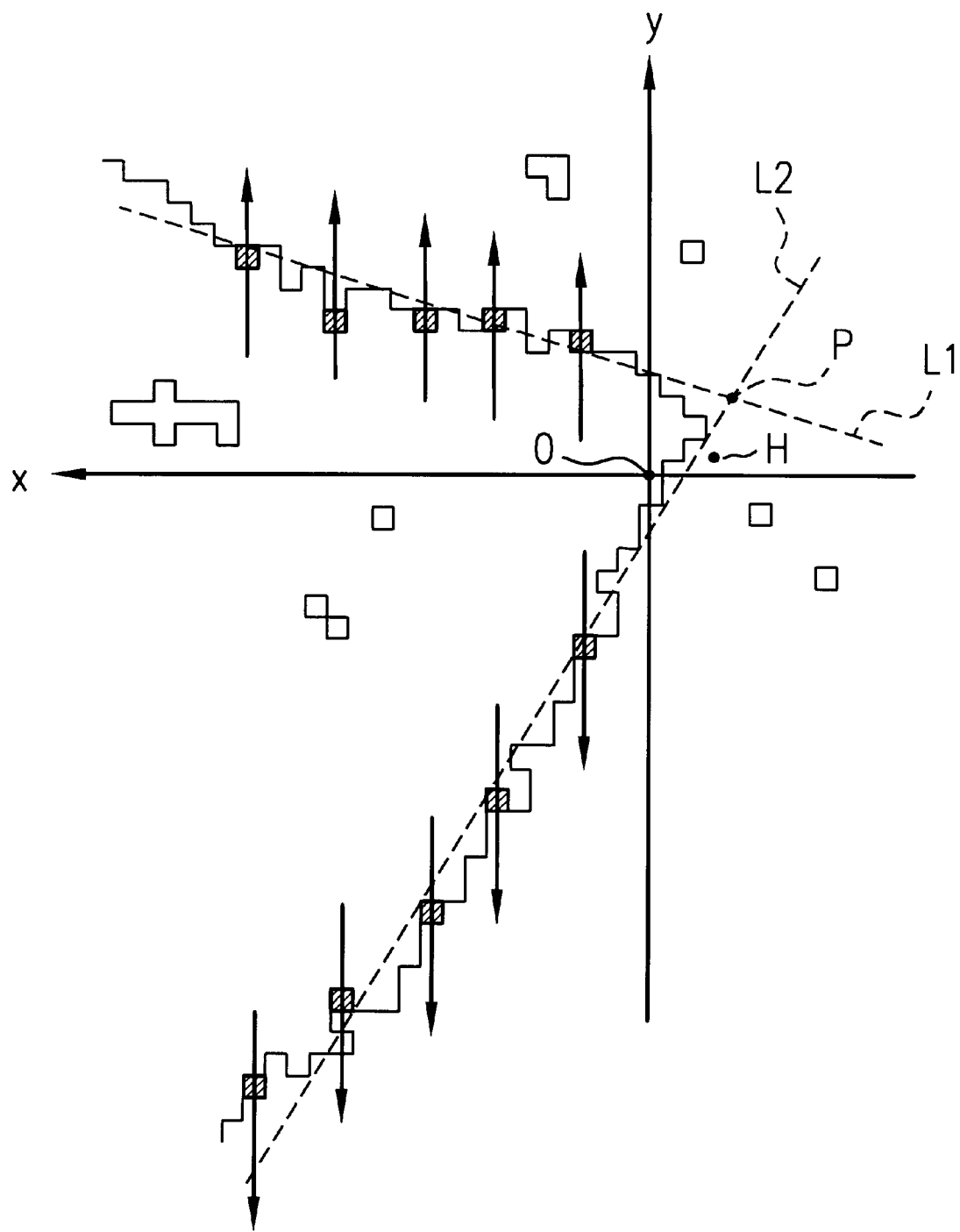
FIG. 8 illustrates how a corner is detected by the location detection unit.
Figure 9:
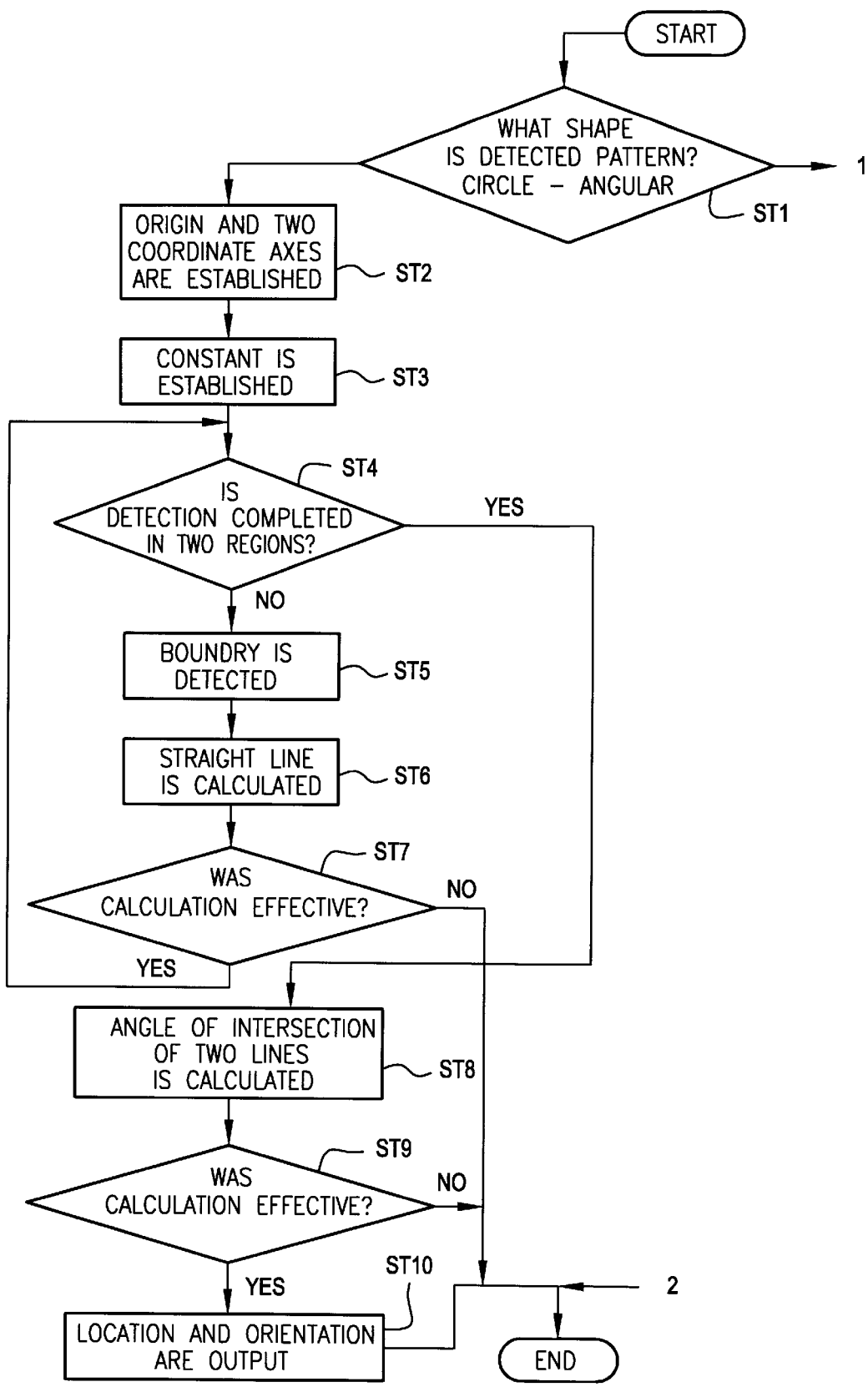
FIG. 9 is a flowchart of the corner detection operation executed by the location detection unit.

The approximate location of the apex of a corner (i.e., the hit point) and the orientation of the angle are known from the rough search. As can be seen in FIGS. 8 and 9, a hypothetical origin 0 is established in a specified location inside the corner near hit point H. An X axis, which traverses hypothetical origin 0 along the horizontal, and a Y axis, which traverses origin 0 along the vertical, are then established (Steps 1 and 2 in FIG. 9).

A constant is established as required to detect specified locations in the pattern (Step 3 in FIG. 9). We move along the X axis in fixed increments (shown by arrows in the drawing), and at each increment we scan in the positive (upward) and negative (downward) directions parallel to the Y axis, determining whether each pixel we encounter is black or white. We find the border between black and white (called "the edge" hereafter to indicate the change from black to white) (Steps 4 and 5 in FIG. 9), and draw a straight line which follows the edge (shown as hatched portions in the drawing) as closely as possible. This can be done, for example, by using the least squares method to approximate a straight line from a number of edges which have been detected (Steps 6 and 7 in FIG. 9). When this processing is executed, two lines are obtained, $L_1$ and $L_2$, which link the two edges located on either side of the X axis. We obtain the intersection of the two lines and call this intersection apex P (Steps 8 and 9 in FIG. 9).

The orientation of the corner can be calculated accurately using either the slope one of the lines (edges) detected or the slope of the line which bisects the angle formed by the two lines (Step 10 in FIG. 9). The coordinates of the apex and the slope are transmitted to CPU 30.

If when the aforesaid apex is extracted two edges cannot be found, or if an insufficient number of edge data are found, or if the angle formed by the two edge lines varies substantially from the specified angle, then a judgment will be rendered that the pattern found is not the corner we are seeking (i.e., it is not the specified pattern to be detected), and output will cease.

We shall next discuss pattern matching device 3. In this embodiment, the device and method of this invention exist as one of the functions of pattern matching device 3. As shall be explained herein, pattern matching device 3 compares a pattern in the image which it receives with a set of reference patterns. The set used to generate counterfeit probability data concerning the probability of a counterfeiting attempt includes not only (1) the characteristic pattern peculiar to a non-reproducible document, but also (2) patterns representing the results of tampering with that characteristic pattern as well as (3) patterns peculiar to ordinary documents. We shall begin our discussion with an explanation of the reference pattern peculiar to non-reproducible documents (bank notes, negotiable securities, and so on).

THE CHARACTERISTIC PATTERN PECULIAR TO A NON-REPRODUCIBLE DOCUMENT

Figure 10:
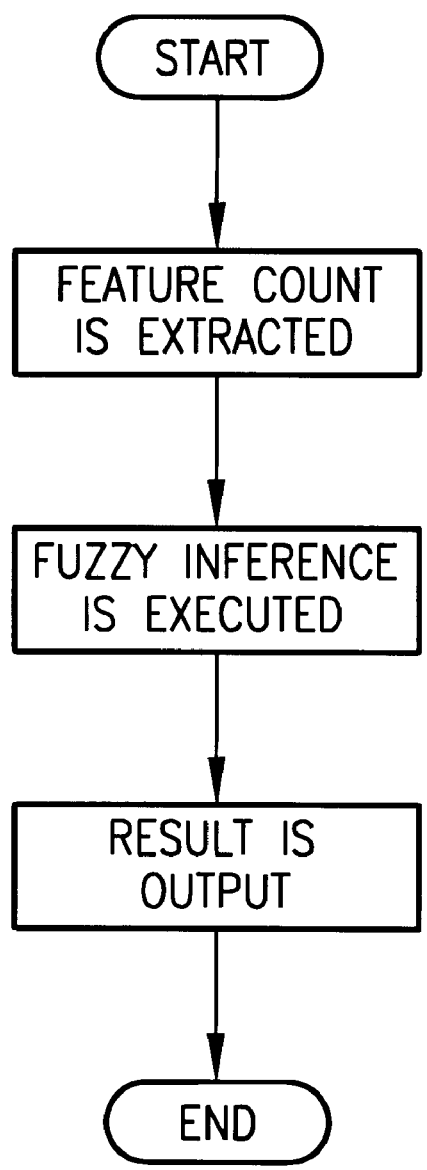
FIG. 10 is a flowchart of the operation executed by the pattern matching device.

First, as can be seen in FIG. 7, position detection unit 25 transmits to CPU 30 the coordinates of the apex and slope of a corner of a pattern which resembles the characteristic pattern or, if the pattern is a mark, the coordinates of its center point. Based on data stored in program ROM 30*a*, CPU 30 specifies which of the image data stored in second detailed memory 24 should be read out. It obtains the region of the image which is needed for pattern matching. In response to a control signal from CPU 30, the image data representing this region are sent from second detailed memory 24 to inference unit 35. Inference unit 35 executes inference processing using fuzzy knowledge which includes the rules for the characteristic pattern (i.e., the reference pattern which identifies a non-reproducible document) which are stored in memory 36*a* and the membership functions for the pattern which are stored in memory 37*a*. A judgment is rendered as to the goodness of fit between the received image data (i.e., the pattern found in the data) and a previously established pattern (i.e., the reference pattern peculiar to a non-reproducible document) (See FIG. 10).

Figure 11A:
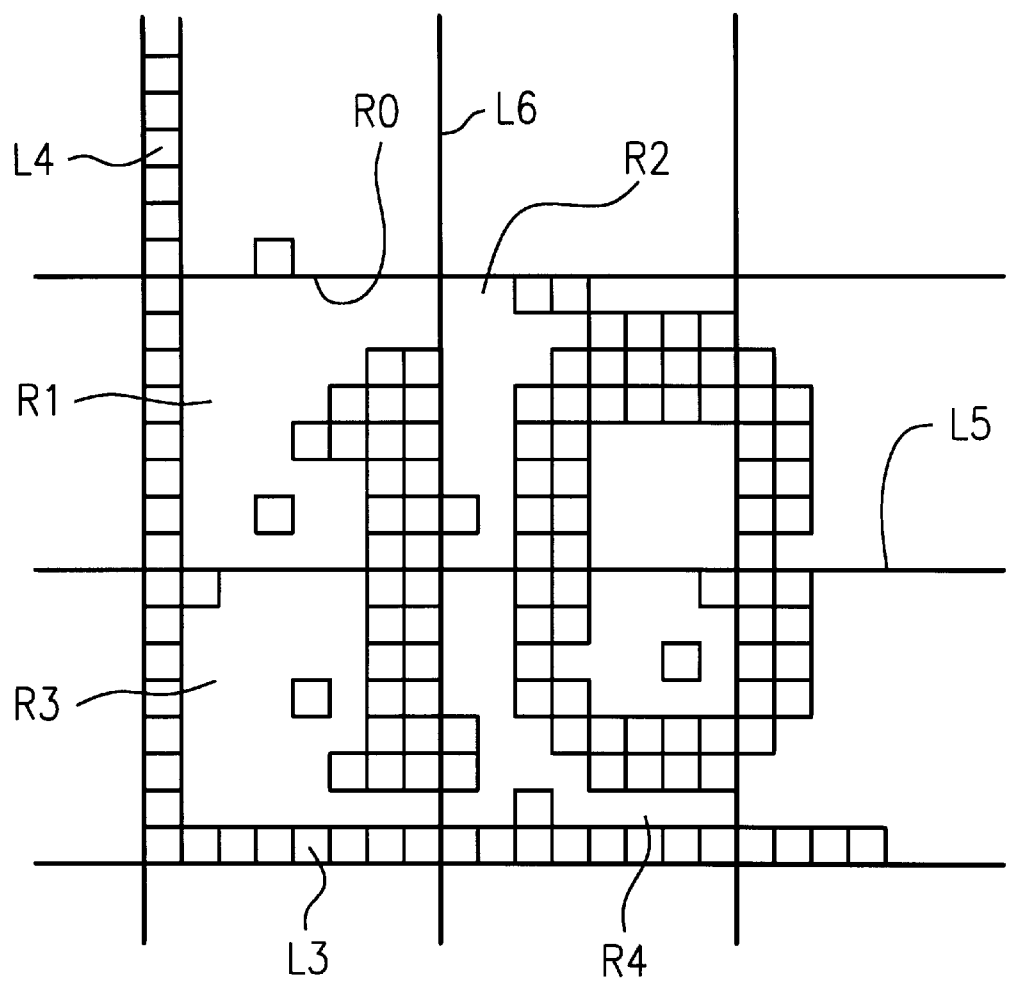
FIG. 11 shows the result when the pattern matching device has extracted the pixel count from each region of the pattern identifying a non-reproducible document.
Figure 11B:
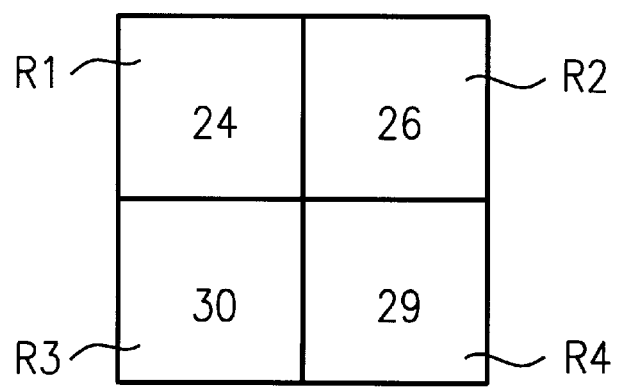

A specific example of this comparison is given in FIG. 11 (A). The unaltered image data (original image data) which have been extracted are divided into regions for feature counts (in this example, square region $R_0$, which lies inside the corner of the L-shaped pattern formed by horizontal line $L_3$ and vertical line $L_4$, and regions $R_1$, $R_2$, $R_3$ and $R_4$, created by horizontal and vertical lines $L_5$ and $L_6$, which divide the larger region like a lattice). A feature count is extracted for each region by counting the pixels in that region. In this embodiment, the pattern chosen to identify non-reproducible documents such as bank notes and stock certificates is a relatively large (say, one centimeter square) number "10" which is largely contained in a square region of a given size mapped out on the inside of the L-shaped pattern described above. The pattern shown in FIG. 19, which will be discussed later, is one found on an ordinary document which may legally be reproduced, and is chosen by experience from all such documents. When we look at a square region $R_0$ of the given size which is mapped out on the inside of the same sort of L-shaped pattern, we find that the characteristic pattern in that region has the same number of black pixels in each of subregions $R_1$, $R_2$, $R_3$ and $R_4$. Based on the fact that, as will be discussed later, the pixel counts in all four regions will be virtually identical, we can judge that it is highly probable that this is an ordinary document. The contrasting case of a non-reproducible document is shown in FIG. 11 (B). The pixel count in region $R_1$ is 24; that in $R_2$ is 26; that in $R_3$ is 30; and that in $R_4$ is 29. The counts in the four regions tend to be distributed in a fashion which is unique to the non-reproducible document.

Figure 12:
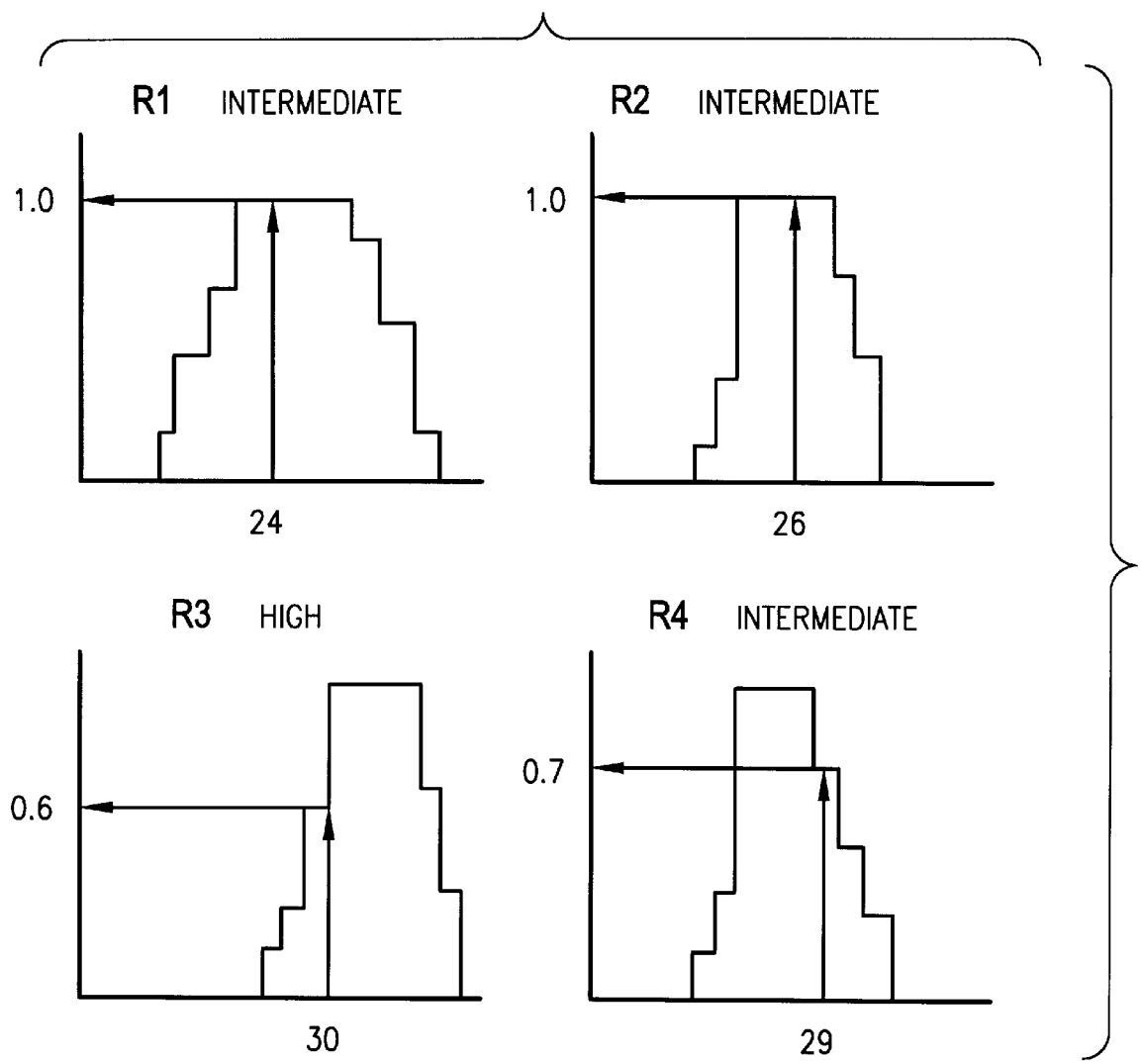
FIG. 12 gives an example of rules and membership functions which might be stored in their respective memories in the pattern matching device for a pattern on a non-reproducible document.

A fuzzy inference is performed according to rules and membership functions (shown in FIG. 12) which have been established ahead of time, using as input data the feature counts (i.e., the number of black pixels in each of regions $R_1$ through $R_4$) which have been extracted. The goodness of fit between the input data and the reference pattern is judged, and this value is output as the counterfeit probability data. In this example, the goodness of fit is 0.825. Since this value is well above the reference value of 0.5 which indicates correlation, the copy machine can judge that, based on the probability data, the probability that someone is attempting to copy a non-reproducible document is high.

Although in this example the feature count regions are equal squares created by a grid, they could just as well be concentric circles, rectangles, or any other desired shape. No matter what method is used to create the regions, it is desirable that they be selected so that the characteristic pattern which identifies a reproducible document, as will be discussed later, has an equal number of black pixels in each region. The feature count to be extracted is not limited to the pixel count described above. Continuous or discontinuous pixels could also be counted, as could pixels along a given path.

In this example, the aforesaid fuzzy knowledge is assembled by collecting various items of knowledge concerning a single characteristic pattern, and the inference is processed using these various facts. It sometimes happens that a printing error or other accident will cause the image data which are read to be slightly different from the reference pattern for a non-reproducible document, and to be shifted slightly from where they ought to be. In cases in which the pattern is a mark, the angle of rotation is often unclear. A slight shift in the location of a pattern can be accommodated by assembling and storing knowledge representing various angles at which the pattern might be rotated.

Figure 13A:
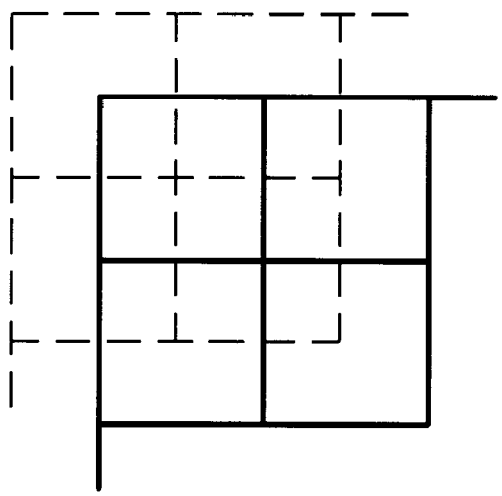
FIG. 13 illustrates how fuzzy knowledge can be generated automatically using the pattern matching device.
Figure 13B:
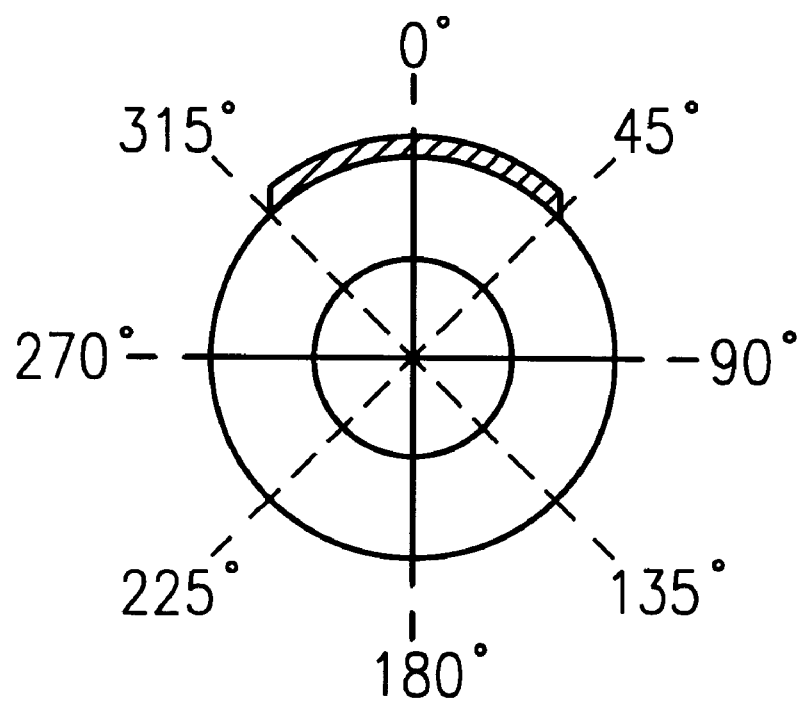

A specific example involving a corner is shown in FIG. 13 (A). Map data (equivalent to the image data output by binary device 2 in pattern extraction device 2 when the pattern has been read by the copy machine) obtained by reading the image at a given resolution are generated for an image which corresponds to the center of the pattern to be detected (shown by solid lines). In the same way, map data are generated for the same image which has been shifted slightly left, right, up and to the left, up and to the right, down and to the left and down and to the right. (The example shows the image shifted up and to the left in broken lines.) Fuzzy knowledge is generated for each image. In this way a single pattern (in this case, a corner) can be used to generate a number of sets of fuzzy knowledge to cover a variety of ways in which the image might be shifted.

An example involving a mark is shown in FIG. 13 (B). Map data (equivalent to the image data output by binary device 2 in pattern extraction device 2 when the pattern has been read by the copy machine) obtained by reading the image at a given resolution are generated for the pattern to be detected (i.e., the reference pattern) based on an image whose angle of rotation is 0° (when the image is not shifted up, down, or to either side). In the same way, map data are generated after the polar coordinates are converted for the same image which is rotated in 45° increments. Fuzzy knowledge is generated for each image. In this way a single pattern (in this case, a mark) can be used to generate a number of sets of fuzzy knowledge to cover a variety of ways in which the image might be rotated.

The various sets of fuzzy knowledge obtained in this way are assembled into knowledge groupings. The highest goodness of fit resulting from the inferences made using the various knowledge groupings is considered to indicate that the pattern has been recognized. This method allows us to extract an image without having to consider the direction in which the mark is rotated or how far the corner is shifted, since these problems can be addressed by the inference processing.

It would also be possible to generate the fuzzy knowledge by doing statistical processing on all the shifted images without grouping the knowledge in this way. (In this case, the final knowledge may be lumped together in a single set, or a number of knowledge sets may be generated for a single reference pattern which has been rotated or shifted.) If we compare the two methods, the former (using knowledge groupings) offers the advantage of a higher recognition rate, while the latter results in a shorter processing time. The user may choose whichever is better suited to his needs.

If the image has been shifted by a single pixel (or by a number of pixels which is a multiple of an integer), the data can be addressed while either the reference pattern or the pattern being processed is repeatedly shifted in a given direction. This will produce the same function or effect as can be achieved with a number of knowledge sets, even though such sets are not being stored in the memory. This method, too, will allow the pattern to be recognized accurately when the image is shifted. The concept of this invention, then, is that a number of knowledge sets are produced using a single pattern. This concept embraces both the method by which knowledge data are actually stored in the memory and the method described above in which hypothetical data are used.

As described above, the goodness of fit generated by an inference based on a number of knowledge sets is output as counterfeit probability data to the PPC (i.e., the copy machine) by way of CPU 30. If this goodness of fit exceeds a given threshold, the copy machine concludes that the document being copied is a non-reproducible item such as a bank note, and executes its specified processing to prevent counterfeiting (refusing to copy, outputting a copy which is completely black, etc.) As will be discussed in detail at a later point, CPU 30 could alternatively perform the judgement of whether the document being processed is a non-reproducible item such as a bank note (actually, it would judge whether the pattern on the document is the one which tags non-reproducible items). It would then output the result (as, say, a halt signal) to the PPC.

PATTERNS REPRESENTING THE RESULTS OF TAMPERING WITH THAT CHARACTERISTIC PATTERN

We shall next discuss the processing required to match image data against a reference pattern which is an altered version of the pattern which tags non-reproducible documents (bank notes, stock certificates, etc.)

As discussed above and pictured in FIGS. 11 and 12, the pattern chosen to identify non-reproducible documents such as bank notes and stock certificates is a relatively large (say, one centimeter square) number "10" which is largely contained in a square region of a given size mapped out on the inside of an L-shaped pattern formed by horizontal line $L_3$ and vertical line $L_4$. If there is a large number "10" in region $R_0$ of the image data read off the document, then, CPU 30 will generate and output data to the effect that there is a high probability that a counterfeiting attempt is occurring. In response, the PPC will be able to institute appropriate measures to prevent counterfeiting, such as preventing copying.

Figure 16A:
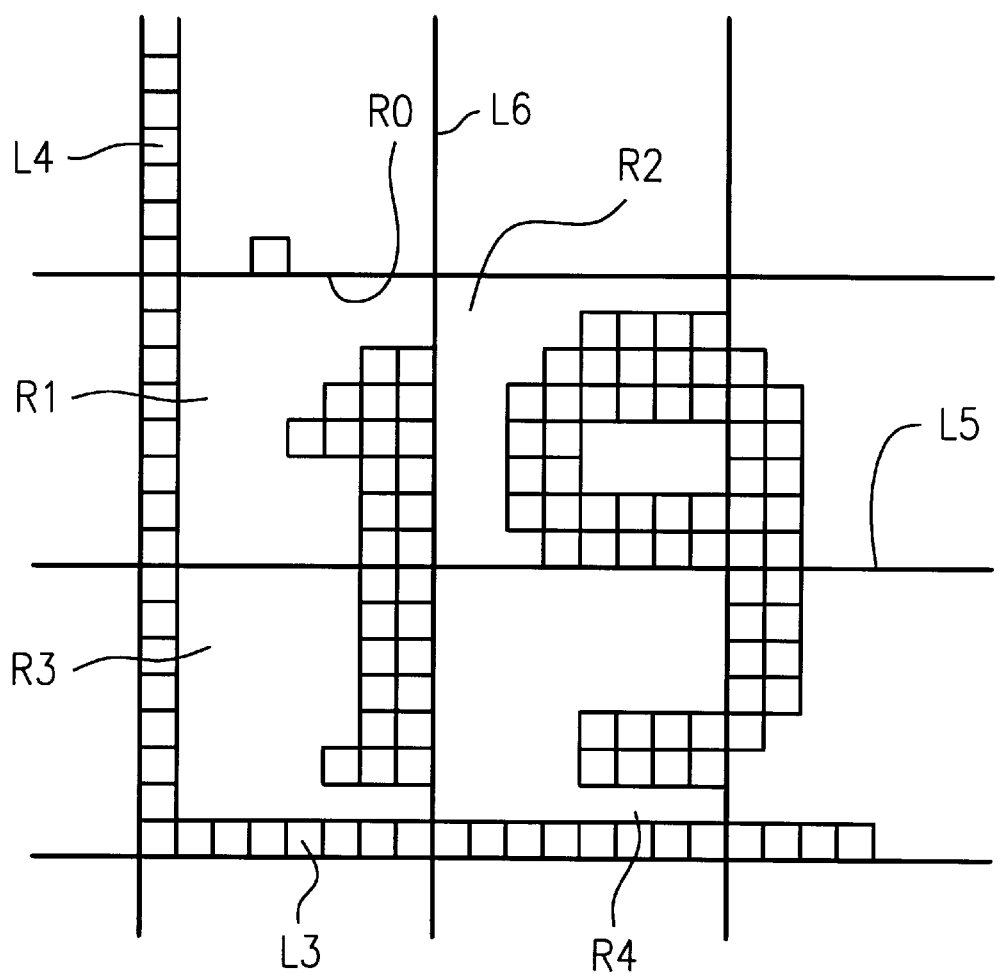
FIG. 16 shows the result when the pattern matching device has extracted the pixel count from each region of an altered version of the pattern identifying a non-reproducible document.
Figure 16B:
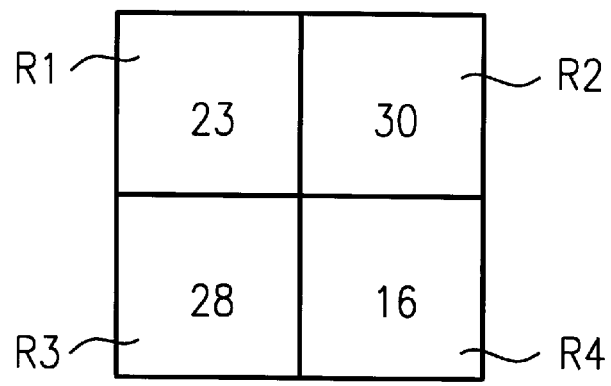
Figure 17:
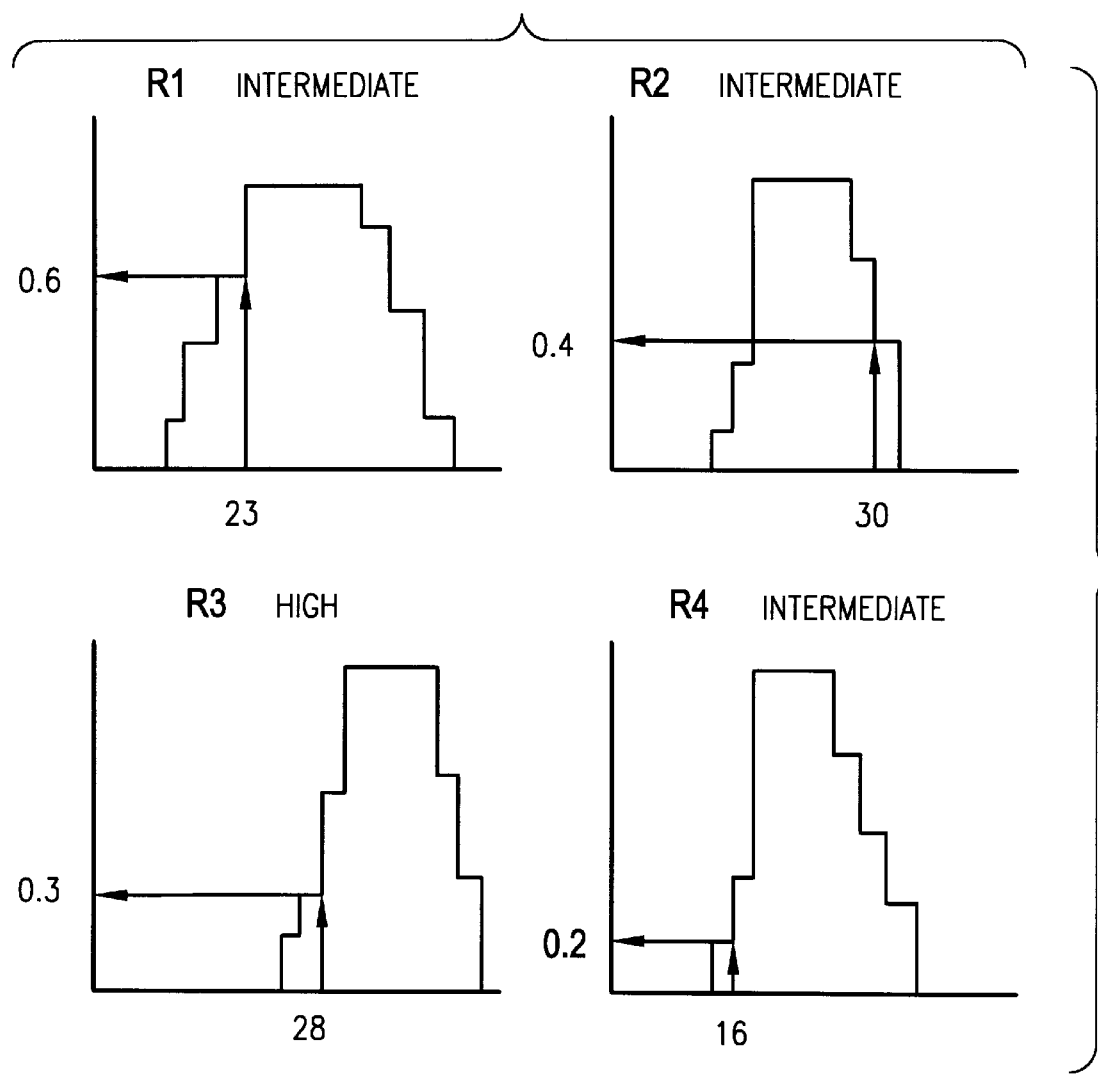
FIG. 17 gives an example of rules and membership functions which might be stored in their respective memories in the pattern matching device for an altered version of the pattern on a non-reproducible document.

Let us assume, however, that someone has erased the lower left-hand portion of the "0" in the number "10" which is the pattern in region $R_0$ and added a horizontal line to turn the "0" into a "9", as shown in FIG. 16 (A). The human eye (or the human psychology) is not likely to notice the difference between the original "10" and the altered "19". When viewed by a mechanical eye, as shown in FIG. 16 (B), region $R_1$ produces a pixel count of 23, $R_2$ of 3, $R_3$ of 28 and $R_4$ of 16. These counts differ significantly from the counts for the same regions in the unaltered image, which are 24 for $R_1$, 26 for $R_2$, 30 for $R_3$ and 28 for $R_4$. When the counts for the altered image are fitted into the membership functions and rules for the pattern which tags a non-reproducible document, the goodness of fit will be found to be 0.375, as shown in FIG. 17. Since this falls well below the reference value of 0.5 which indicates correlation, it will mistakenly be judged that the probability of a counterfeiting attempt is extremely low, and the copy machine will not be made to take measures to prevent copying.

Figure 18:
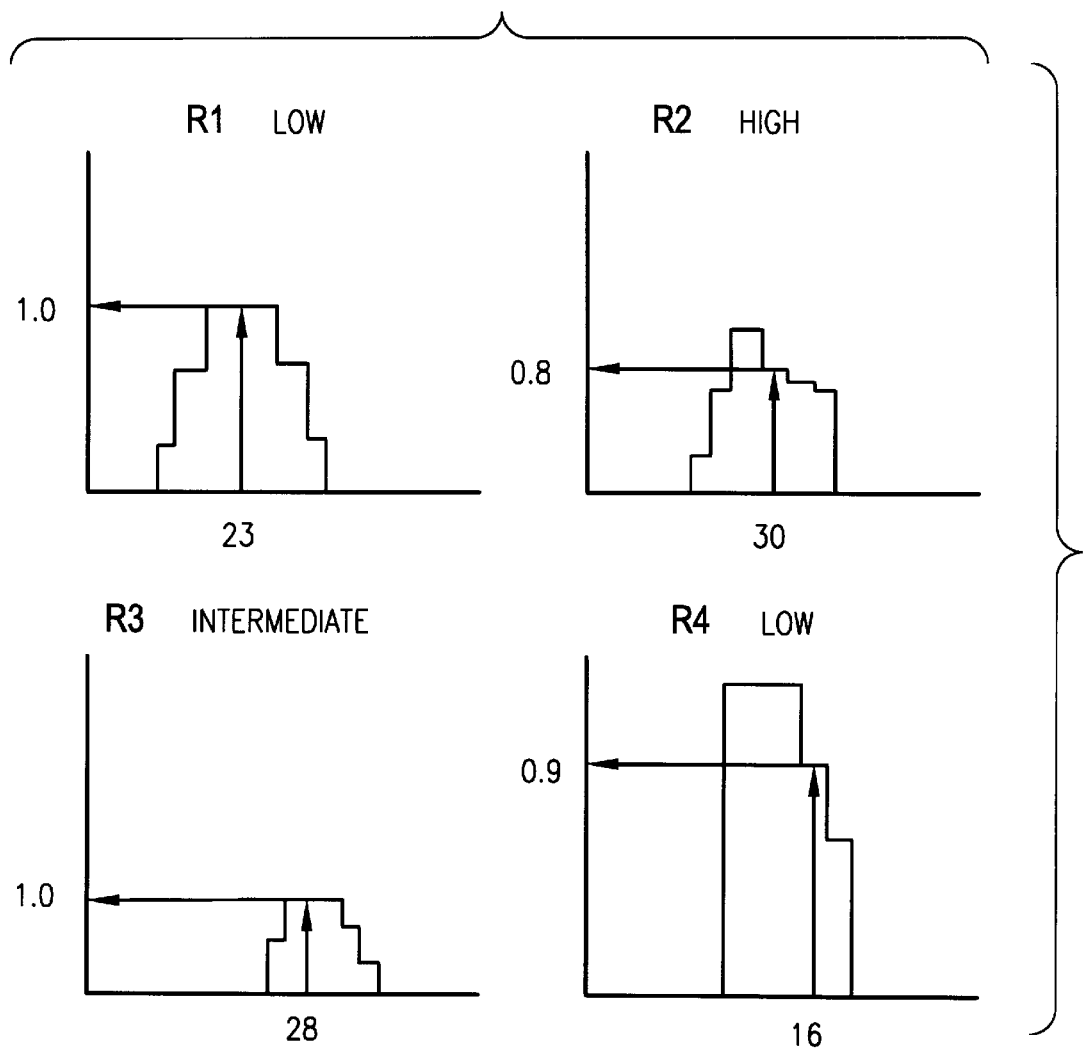
FIG. 18 shows the result of matching an altered version of the pattern using rules and membership functions stored in their respective memories in the pattern matching device.

With this invention, therefore, we employ not only membership functions and rules for the pattern which tags a non-reproducible document (shown in FIG. 11), but also functions and rules (shown in FIG. 17) for the pattern (shown in FIG. 16) which results from altering that pattern. These are stored in rule memory 36b and membership memory 37b. Goodness of fit is calculated using not only the membership functions and rules for the original pattern, but also the functions and rules for the altered pattern. When the pixel counts for the altered image are fitted into the membership functions and rules for an altered image, the goodness of fit will be 0.925, as shown in FIG. 18. Since this value is well above the reference value of 0.5, the data will be able to suggest that there is a significant probability that a counterfeiting attempt is occurring even though the pattern has been altered. Based on this finding, the copy machine will be able to institute its specified measures to prevent copying.

PATTERNS PECULIAR TO ORDINARY DOCUMENTS

We shall next discuss the processing involved in matching the image data against a reference pattern peculiar to an ordinary reproducible document.

As discussed above and pictured in FIGS. 11 and 12, the pattern chosen to identify non-reproducible documents such as bank notes and stock certificates is a relatively large (say, one centimeter square) number "10" which is nearly contained in a square region of a given size mapped out on the inside of an L-shaped pattern formed by horizontal line $L_3$ and vertical line $L_4$. The pattern chosen as an altered version of this pattern is the number "19" shown in FIG. 16. If there is a large number "10" or "19" in region $R_0$ of the image data read off the document, then, CPU 30 will generate and output data to the effect that there is a high probability that a counterfeiting attempt is occurring. In response, the PPC will be able to institute appropriate measures to prevent counterfeiting, such as preventing copying.

However, there may be cases in which the number "10" is altered, but not as much as predicted, or in such a way that its appearance differs somewhat from what is predicted. In such cases, even though the image data are matched against the original and the altered reference pattern, the probability data which are generated will be ambiguous.

Figure 19A:
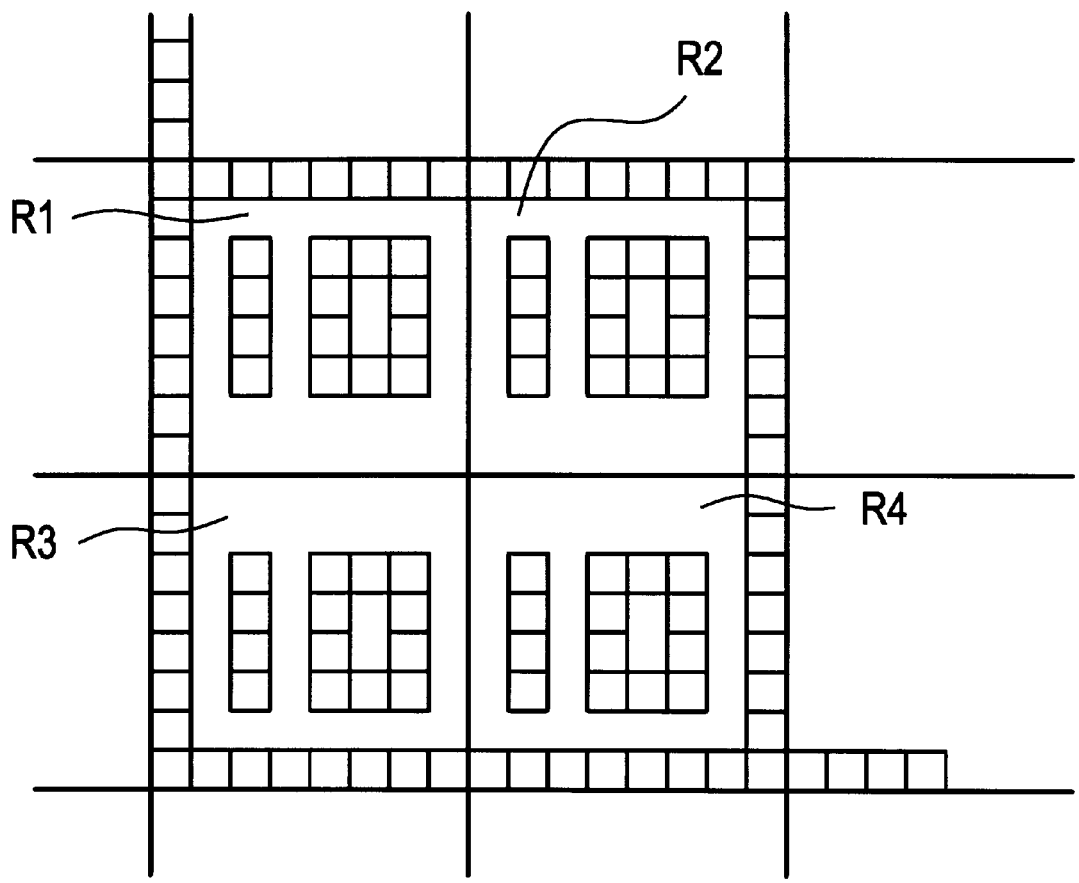
FIG. 19 shows the result when the pattern matching device has extracted the pixel count from each region of a pattern identifying an ordinary reproducible document.
Figure 19B:
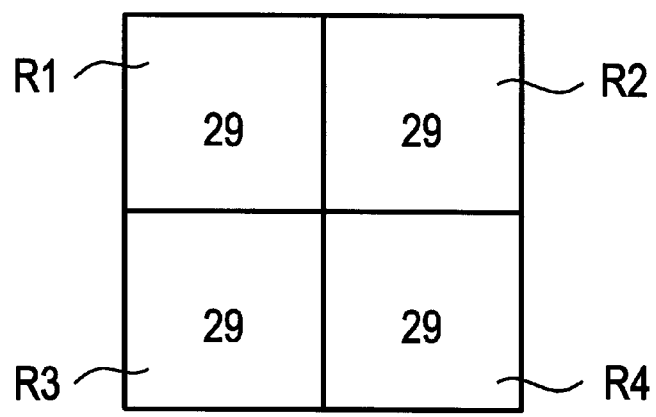
Figure 20:
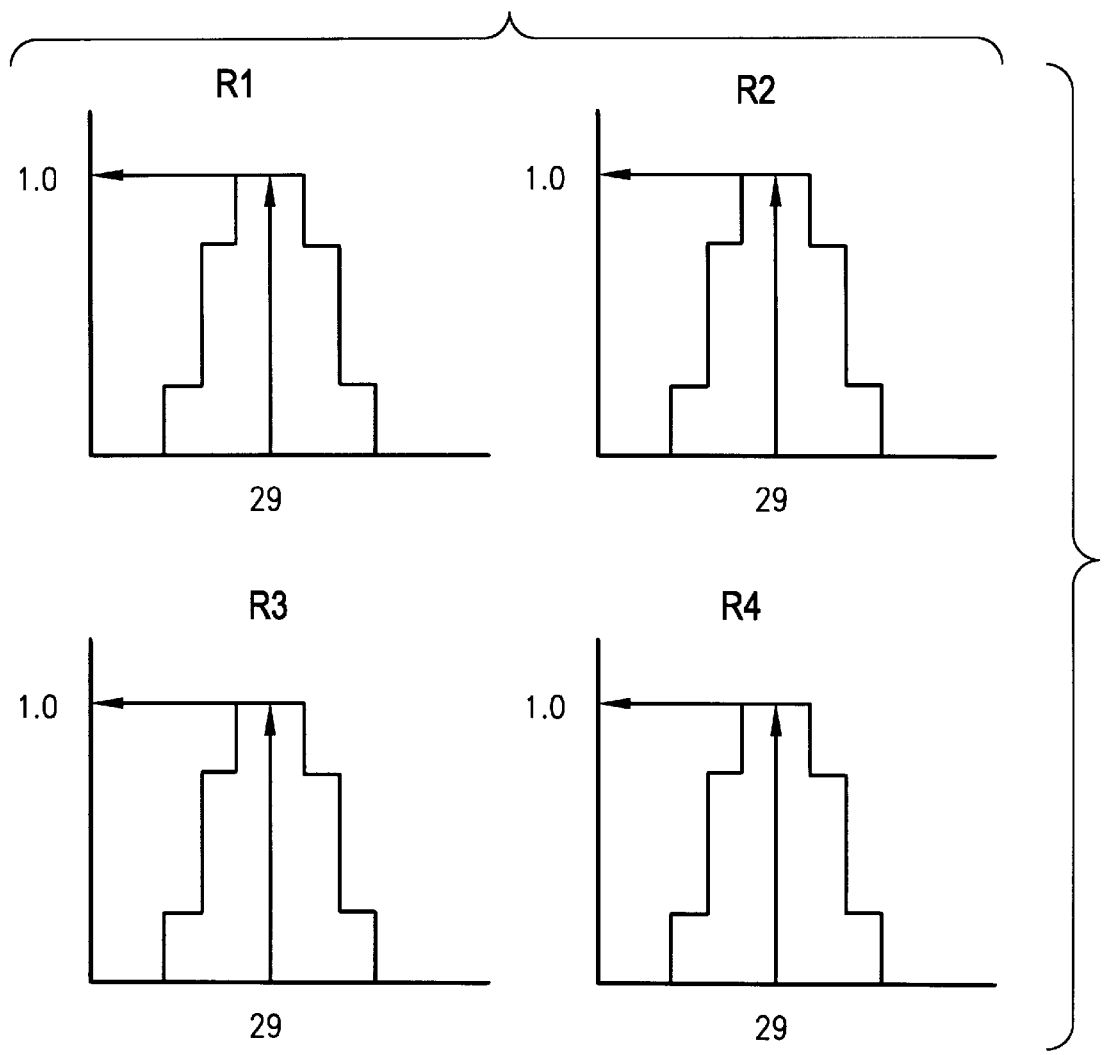
FIG. 20 gives an example of rules and membership functions which might be stored in their respective memories in the pattern matching device for a pattern identifying an ordinary reproducible document.

With this invention, we employ not only membership functions and rules for the aforesaid pattern which tags a non-reproducible document and for an altered version of that pattern, but also functions and rules for a pattern which tags an ordinary reproducible document. These are stored in rule memory 36c and membership memory 37c. Goodness of fit is calculated using not only membership functions and rules for the original and altered patterns, but also functions and rules for the ordinary document. The pattern is chosen from experience with every type of document which may be reproduced. When we look at a square region $R_0$ of the given size which is mapped out on the inside of the same sort of L-shaped pattern, we find that the characteristic pattern in that region, which is shown in FIG. 19, is a regular arrangement of small "10"s. Each of subregions $R_1$, $R_2$, $R_3$ and $R_4$ has the same number of black pixels $R_n$ (where n=1, 2, 3 or 4), namely, 29. When matching the image data against the reference pattern which tags a non-reproducible document or against an altered version of that pattern yields a result which suggests a counterfeiting attempt, and the pixel count is 29 (intermediate) in each of regions $R_1$, $R_2$, $R_3$ and $R_4$, goodness of fit can be calculated by fitting the pixel data into membership functions and rules for an ordinary document, as shown in FIG. 20. The goodness of fit with respect to the ordinary document will be 1.0, and CPU 30 will generate and output data to the effect that there is an extremely high probability that this is a reproducible document. Based on these data, the PPC can be prevented from mistakenly preventing copying.

When the three goodness of fit values described above are calculated, a signal from CPU 30 causes switching unit 38 to operate in an appropriate fashion so that either memories 36a and 37a, 36b and 37b, or 36c and 37c are connected to fuzzy inference unit 35. The memories are switched after each scan. In the example shown in FIG. 7, one memory each is provided for an original pattern, an altered pattern, and a pattern on an ordinary reproducible document. However, more memories could be provided for various original patterns, various types of alterations and various kinds of ordinary documents.

The three goodness of fit values which constitute the counterfeit probability data generated by the pattern matching device are stored in memory 39 and transmitted to the copy machine with appropriate timing. Two methods may be used for their transmission. One involves using three separate hard output devices for the goodness of fit value for the original pattern, that for the altered pattern, and that for the pattern on an ordinary document (space sharing transmission method). The other involves using a single hard output device and distinguishing the goodness of fit values by affixing an identification code to each one (time sharing transmission method). CPU 30 has a built-in capability of counting the original and/or altered patterns found in the image. This count value is also transmitted to the copy machine.

In the examples in FIGS. 16 through 20, the dictionary used for matching is recorded as the shapes of the fuzzy membership functions, and unaltered non-reproducible documents, altered non-reproducible documents and reproducible documents are distinguished from one another by the shapes of their membership functions and rules. The device could be modified by adding a binary threshold (to detect altered colors) or a decoder circuit (18c in FIG. 5) (to detect altered shapes) to pattern detection device 1.

Figure 14:
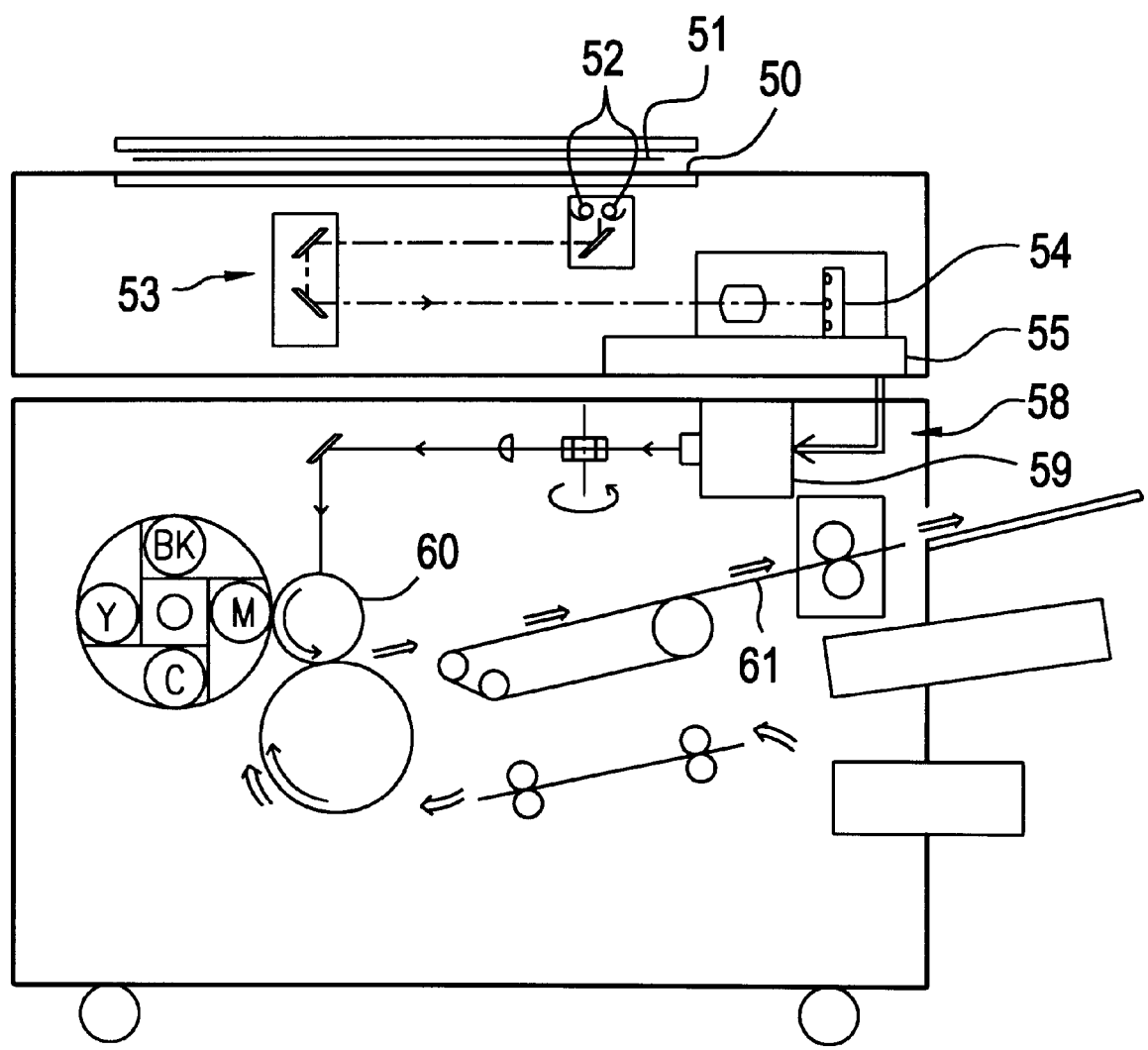
FIG. 14 shows an example of a copy machine according to this invention.
Figure 15:
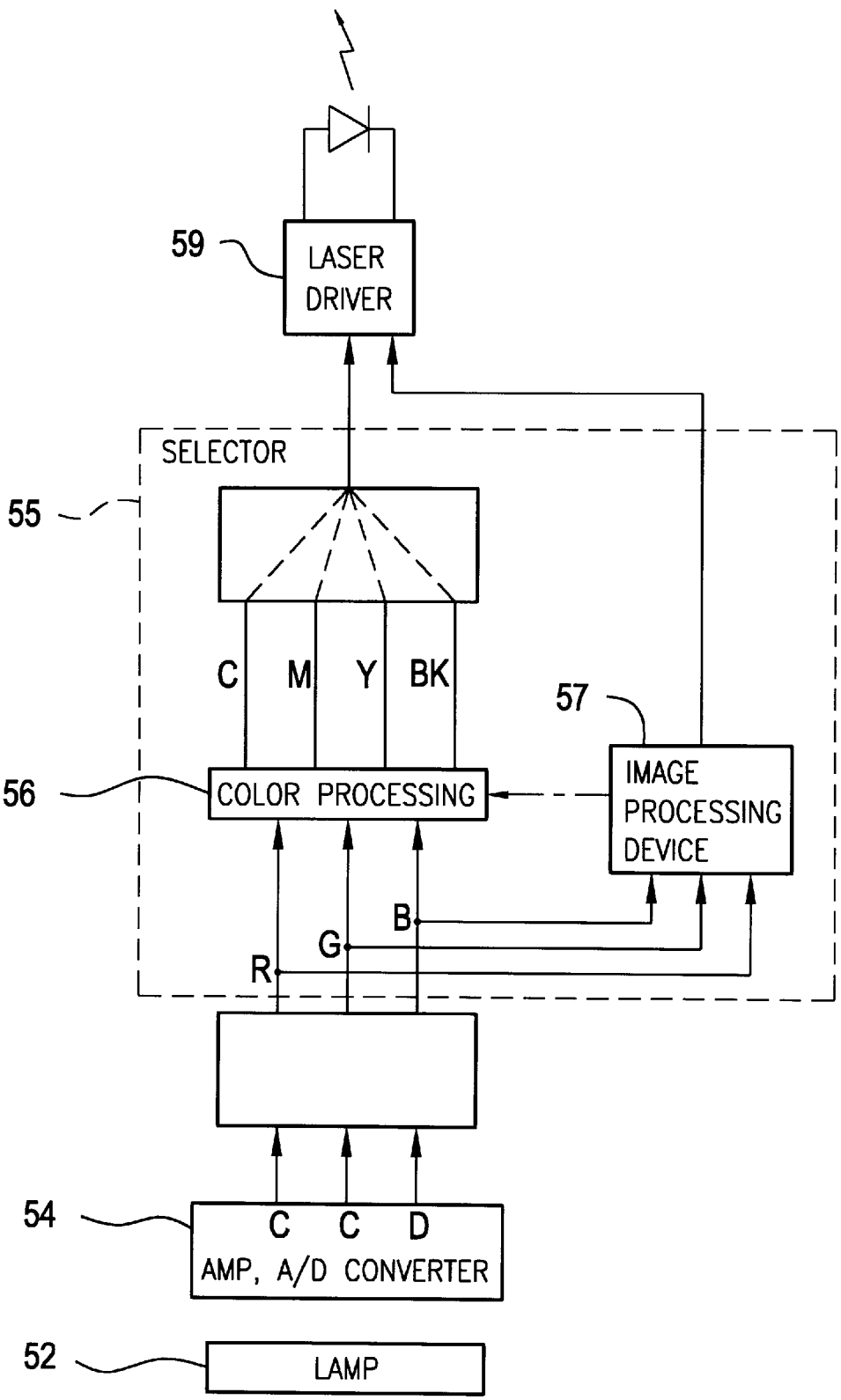
FIG. 15 shows an example of a circuit in a copy machine according to this invention.

FIGS. 14 and 15 show how the aforesaid device may actually be installed in a copy machine. As shown in the drawing, the light emitted by lamp 52 is reflected by document 51, which is loaded on glass 50. The reflected light passes through optical system 53 and enters CCD 54, which is an image sensor. Here the image on the document is read. Lamp 52, as well as the flat mirror and other components which comprise optical system 53, moves at a specified speed as it scans the document. Line by line, CCD 54 reads the specified portion of document 51, and it transmits the image data (R/G/B) to signal processing unit 55.

Signal processing unit 55, which is pictured in FIG. 15, has an ordinary color processing circuit 56 and an image processing device 57 (300), consisting of the aforesaid pattern detection device 1, pattern extraction device 2 and pattern matching device 3. The aforesaid image data are transmitted in parallel to color processing circuit 56 and to image processing device 57. Color processing circuit 56 analyzes the colors into their various components, magenta (M), cyan (C), yellow (Y) and black (Bk), and outputs these data to printing device 58. The image is actually scanned four times. One of the aforesaid four components (M, C, Y, or Bk) resulting from the first scan is output to laser driver 59, which is located on the input side of printing device 58. This causes a laser beam to be projected onto a specified location on light-sensitive drum 60. When the fourth scan has been completed, the copying operation is executed on the copy paper, and the finished copy 61 is output. Since the actual mechanism which executes the copying operation is identical to that of existing copiers, we shall omit an explanation of its action.

While the aforesaid image processing circuit 56 is processing the signals and in parallel with this processing, image processing device 57 performs the processing described above and obtains the goodness of fit of the pattern in the image data being read with respect to the reference pattern. If document 51 is a non-reproducible item such as a bank note, a control signal is generated to halt the output of the aforesaid laser driver 59. Alternatively, a control signal may be sent to color processing circuit 56 to cause it to execute its various routines for situations when copying is prohibited, such as making the entire image black.

Since in this example the judgement processing is executed in real time during a single scan, this image processing device could be used in the type of copy machine which scans the document only once. It could, of course, also be used in a machine which uses multiple scans. In such copy machine, the CPU 30 pictured in FIG. 2 could transmit control signals to pattern detection device 1, and a different pattern could be detected on each scan.

To detect one pattern on each scan as mentioned above, CPU 30 could transmit a control signal to detection device 1 after the first scan had been completed but before the second scan commenced. This signal would change all the processing parameters (the binary threshold and so on). Writing over the parameters would allow us to detect a number of different patterns. Adopting this configuration for the device, then, would allow us to handle an extremely large number of patterns, which would translate into preventing the counterfeiting of many, many types of bank notes and other non-reproducible documents. Since we are not detecting and matching the entire bank note but only a pattern on a portion of it, the capacities of the various memories need not be large. So even though the device can prevent the counterfeiting of many types of documents, as mentioned above, it has the advantage of not requiring a particularly large overall memory capacity.

Figure 21:
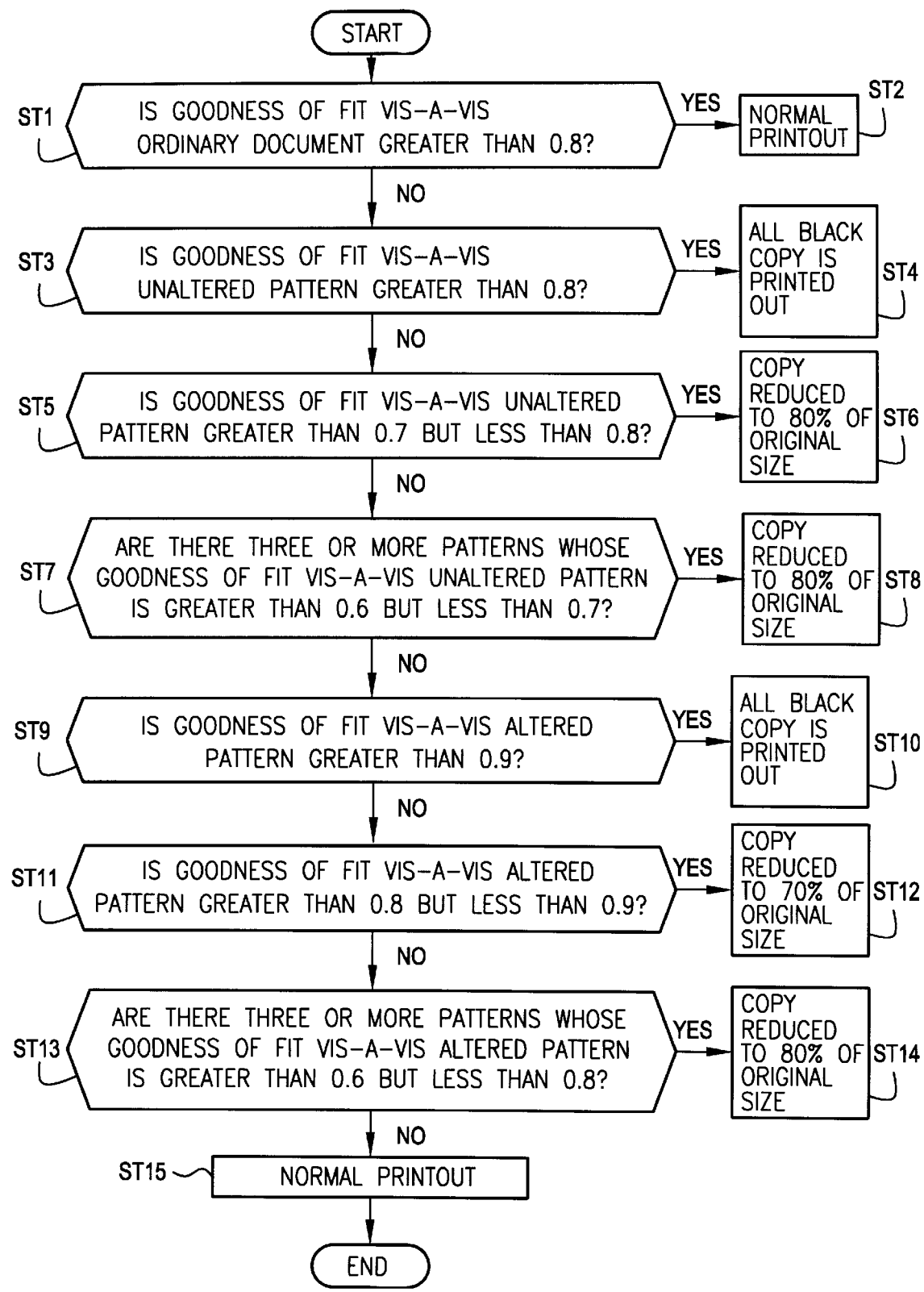
FIG. 21 shows an example of operations executed by the copy machine based on the probability data generated by a pattern matching device according to this invention.

Next, we shall discuss, with reference to the flowchart in FIG. 21, an example of an algorithm used to control the print processing. Such an algorithm is used when goodness of fit values have been generated for the original pattern tagging a non-reproducible document, an altered version of that pattern and a pattern tagging a reproducible document. These values are then provided to the copy machine as representing the probability that a counterfeiting attempt is occurring. The copy machine uses these data along with an algorithm to judge how to control the print processing.

In this copy machine, a specified number of threshold values are used to sort the three goodness of fit values received as counterfeit probability data. The pattern on the reproducible document has only one threshold value, 0.8. The unaltered pattern identifying a non-reproducible document has three: 0.8, 0.7 and 0.6. The altered pattern also has three threshold values: 0.9, 0.8 and 0.6. This copy machine also uses a single threshold value, 3, to sort the number of unaltered and altered patterns received as probability data.

The goodness of fit ADPT (A) for an ordinary document is sorted by binary logic, as either ADPT (A)$\geq$0.8 or ADPT (A)<0.8. The goodness of fit ADPT (B) for a non-reproducible document is sorted by four-valued logic, as either ADPT (B)$\geq$0.8, 0.8>ADPT (B)$\geq$0.7, 0.7>ADPT (B)$\geq$0.6, or 0.6>ADPT (B). The goodness of fit ADPT (C) for an altered non-reproducible document is also sorted by four-valued logic, as either ADPT (C)$\geq$0.9, 0.9>ADPT (C)$\geq$0.8, 0.8>ADPT (C)$\geq$0.6, or 0.6>ADPT (C). The number m of unaltered and altered patterns is sorted by binary logic, as either m$\geq$3 or m<3.

The print processing can be controlled to prevent counterfeiting by fitting these results into the following algorithm to judge the counterfeit probability that a counterfeiting attempt is occurring. If ADPT (A)$\geq$0.8, it is judged that there is zero probability of counterfeiting, and the normal print-out processing is executed. (Answer in Step 1 is "yes"; proceed to Step 2.)

If ADPT (A)<0.8 and ADPT (B)$\geq$0.8, it is judged that it is highly probable that a counterfeiting attempt is occurring, and processing is executed to print out an entirely black image. (Answer in Step 1 is "no"; answer in Step 3 is "yes"; proceed to Step 4.) In this case, not only will the copy be unusable, but even the information which appeared on the original document will be unreadable.

If ADPT (A)<0.8 and 0.8>ADPT (B)$\geq$0.7, it is judged that there is some chance that counterfeiting is being attempted, and a copy is printed out which has been reduced to 70% of the size of the original. (Answer in Step 1 is "no"; answer in Step 3 is "no"; answer in Step 5 is "yes"; proceed to Step 6.) In this case, although the copy will be unusable as an original, the information which appeared on the original will still be legible. Then if by some chance a reproducible document is misidentified, the inconvenience to the user can be minimized.

If ADPT (A)<0.8, 0.7>ADPT (B)$\geq$0.6 and m$\geq$3, the probability of counterfeiting is low from the standpoint of goodness of fit, but high from the standpoint of the number of patterns. (Generally, a would-be counterfeiter will attempt to copy a number of bills at the same time.) A copy is printed out which is 80% of the size of the original. (Answer in Step 1 is "no"; answer in Step 3 is "no"; answer in Step 5 is "no"; answer in Step 7 is "yes"; proceed to Step 8.) In this case, too, the copy will be unusable as an original, but the information which appeared on the original will still be legible. Then if by some chance a reproducible document is misidentified, the inconvenience to the user can be minimized.

If ADPT (A)<0.8, 0.6>ADPT (B) and ADPT (C)$\geq$0.9, it is judged that the probability that this is a counterfeiting attempt is high, and processing is executed to print out an entirely black image. (Answer in Step 1 is "no"; answer in Step 3 is "no"; answer in Step 5 is "no"; answer in step 7 is "no"; answer in Step 9 is "yes"; proceed to Step 10.) In this case, not only will the copy be unusable, but even the information which appeared on the original document will be unreadable.

If ADPT (A)<0.8, 0.6>ADPT (B) and 0.9>ADPT (C)$\geq$0.8, it is judged that there is some chance that counterfeiting is being attempted, and a copy is printed out which has been reduced to 70% of the size of the original. (Answer in Step 1 is "no"; answer in Step 3 is "no"; answer in Step 5 is "no"; answer in Step 7 is "no"; answer in Step 9 is "no"; answer in Step 11 is "yes"; proceed to Step 12.) In this case, although the copy will be unusable as an original, the information which appeared on the original will still be legible. Then if by some chance a reproducible document is misidentified, the inconvenience to the user can be minimized.

If ADPT (A)<0.8, 0.6>ADPT (B) and 0.8>ADPT (C)≧0.6, the probability of counterfeiting is low from the standpoint of goodness of fit vis-à-vis an altered pattern, but high from the standpoint of the number of such patterns. A copy is printed out which is 80% of the size of the original. (Answer in Step 1 is "no"; answer in Step 3 is "no"; answer in Step 5 is "no"; answer in Step 7 is "no"; answer in Step 9 is "no"; answer in Step 11 is "no"; answer in Step 13 is "yes"; proceed to Step 14.)

If ADPT (A)<0.8, 0.6>ADPT (B), 0.6>ADPT (C) and m<3, it will be judged that the probability of counterfeiting is extremely low, and normal print-out processing will be executed. (Answer in Step 1 is "no"; answer in Step 3 is "no"; answer in Step 5 is "no"; answer in Step 7 is "no"; answer in Step 9 is "no"; answer in Step 11 is "no"; answer in Step 13 is "no".)

To sum up, the copy machine sorts goodness of fit values ADPT (A), ADPT (B) and ADPT (C), which represent the probability of counterfeiting, and the number m of unaltered or altered patterns found, using a certain number of threshold values. By fitting the results of the sorting into a specified algorithm to judge the probability of counterfeiting, the copy machine can control its print-out processing in an appropriate fashion.

In the example given above, the probability data sent by CPU 30 to the copy machine are in the form of goodness of fit values ADPT (A), ADPT (B) and ADPT (C) and the number m of unaltered or altered patterns found. The copy machine is responsible for the entire process of sorting the goodness of fit values and the number of patterns and fitting the results into a specified algorithm to judge the probability of a counterfeiting attempt. However, this is merely one embodiment of this invention. It will be clear to an informed person that it would be equally acceptable for the image processing device to sort the goodness of fit values and the number of patterns, judge the probability by fitting the results into a specified algorithm, and transmit the results to the copy machine.

The next issue is about what type of counterfeit probability data should be. That is to say, one can imagine various sorts of data which might be sent to the copy machine to represent the probability of a counterfeiting attempt, as well as various ways in which the copy machine might be controlled to handle these data.

The first type of the counterfeit probability data would be to use as probability data the goodness of fit of the image data vis-à-vis each of the reference patterns (the unaltered pattern, the altered pattern, and/or a pattern from an ordinary document). In this case, the copy machine would have at hand probability data in the form of the goodness of fit vis-à-vis the unaltered pattern, the altered pattern, and/or a pattern from an ordinary document. It could then use these data to judge the counterfeiting probability with the help of selected thresholds and algorithms. This method offers the advantage of considerable freedom of design for the copy machine.

The second type of the data would be to sort the goodness of fit values for each of the patterns according to specified threshold values and use the results of this sorting operation as probability data. This method somewhat limits the freedom which may be exercised in designing an algorithm by which the copy machine can judge the probability of counterfeiting. However, if an appropriate threshold is set, the volume of goodness of fit values which the copy machine is required to sort can be significantly reduced. This will allow the control program for the copy machine to be simplified.

The third type of the data might be to sort the goodness of fit values for each of the patterns according to specified threshold values, take the results of this sorting, and fit them into a specified algorithm to judge the probability of counterfeiting. This method would offer the advantage that the copy machine would have access to extremely reliable probability data obtained by fitting sorted data into an algorithm. If an appropriate algorithm is established, the control program for the image processing device can be significantly simplified.

The fourth type of the data might be to use two or more threshold values to sort the goodness of fit of the image data with respect to a reference pattern identifying non-reproducible documents and/or to an altered version of that pattern. This would mean that the counterfeit probability data would be generated by multiple-valued logic. If the probability data are numerical values which express the goodness of fit with respect to a reference pattern as suggested above, great freedom can be exercised in designing the algorithm for the processing device to use to judge the probability. On the other hand, this method requires a complicated control program for the processing device. If the counterfeiting probability data consist of the results of sorting the goodness of fit values with a single threshold, the volume of processing executed by the processing device to do the sorting can be reduced and its control program can be simplified. However, since the results of this sorting will be binary, as the goodness of fit must be either high or low, setting the wrong threshold will result in counterfeiting attempts being missed and reproducible documents being misidentified. With this fourth type, the goodness of fit vis-à-vis the reference pattern can be sorted into at least three classes. If, for example, the second type described above is applied, the probability data available to the copy machine will have the form of multiple-valued logic, with the three values classes being (1) counterfeiting attempt; (2) no counterfeiting attempt; and (3) possible counterfeiting attempt. With this type of the data, in other words, we would not need to create reference patterns for every possible sort of alteration, but could get by with a minimum requirement. When other types of alterations are encountered, they would be recognized as possible counterfeiting attempts mentioned above (3). Based on these data, the copy machine can add on certain processing when it copies the document, such as reducing or enlarging it, changing its color, or changing its density. The text and shapes on the copy will still be recognizable, but the copy will not be able to pass as an original. In the same way, an algorithm can be chosen for the third type which allows above class (3) data to be produced. This will improve the reliability of the probability data. It would, of course, also be possible to sort the goodness of fit values in the fourth type into four or more classes. In this case, the class (3) data indicating "possible counterfeiting attempt" could be further subdivided.

We shall next discuss, with reference to FIGS. 22 through 26, examples in which the image processing apparatuses of this invention is installed in image equipment other than a copy machine (such as a printer, a scanner or a fax machine). First, to review the original concept, the image processing device we are discussing here consists of pattern detection device 1, pattern extraction device 2 and pattern matching device 3, as shown in FIG. 1. The method and device of this invention are realized as a function of pattern matching device 3.

If we break down the functions of a copy machine, it can be divided into two mutually related devices: a device to read or read and transmit the image, and a device to print out the image which has been read. Each of these devices corresponds to a specialized machine. The device to read or read and transmit the image is analogous to a scanner or a fax machine, and the device to print out the image is analogous to a printer. The entire device in which the two component devices are interrelated is analogous to a computer.

Figure 22:
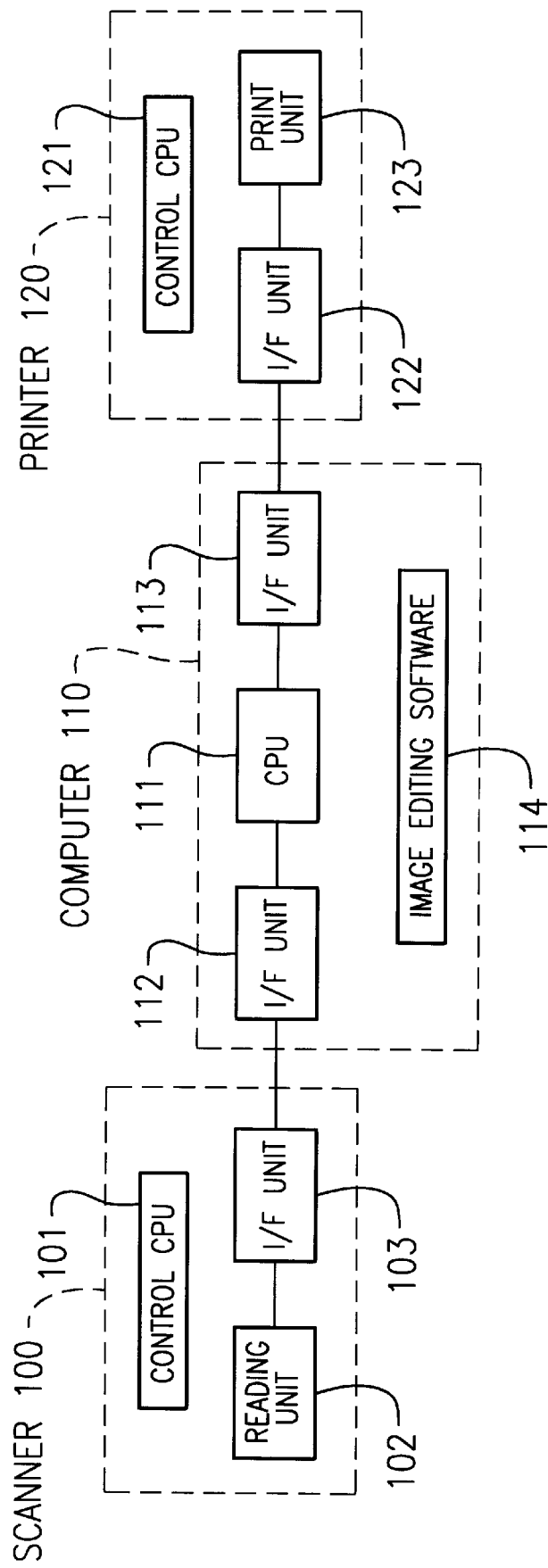
FIG. 22 is a block diagram of the basic configuration of an image reproduction system consisting of a scanner, a computer and a printer.

The system shown in FIG. 22, which consists of scanner 100, computer 110 and printer 120, or a system consisting of two fax machines or a fax machine and a printer mediated by a computer (not pictured) would also be subject to counterfeiting attempts based on altering the identifying pattern.

In the example shown, Control CPU 101 in scanner 100 transmits the image data generated from the document by reading unit 102 (for example, a full-color reading unit) to computer 110 thorough interface unit 103. CPU 111 in computer 110 receives the image data transmitted from scanner 100 and transmits them, either in their raw form or with appropriate alterations added by image editing software 114, to printer 120 through interface unit 113. CPU 121, which controls printer 120, receives the image data transmitted from computer 110 through interface unit 122 and prints them by way of print unit (for example, a full-color print unit) 123.

Such a system is liable to the same sort of counterfeiting attempts as a copy machine. The document which is to be read by scanner 100 can itself be altered, or it can be left intact while its image on the CRT screen of computer 110 is altered using image editing software.

Figure 23:
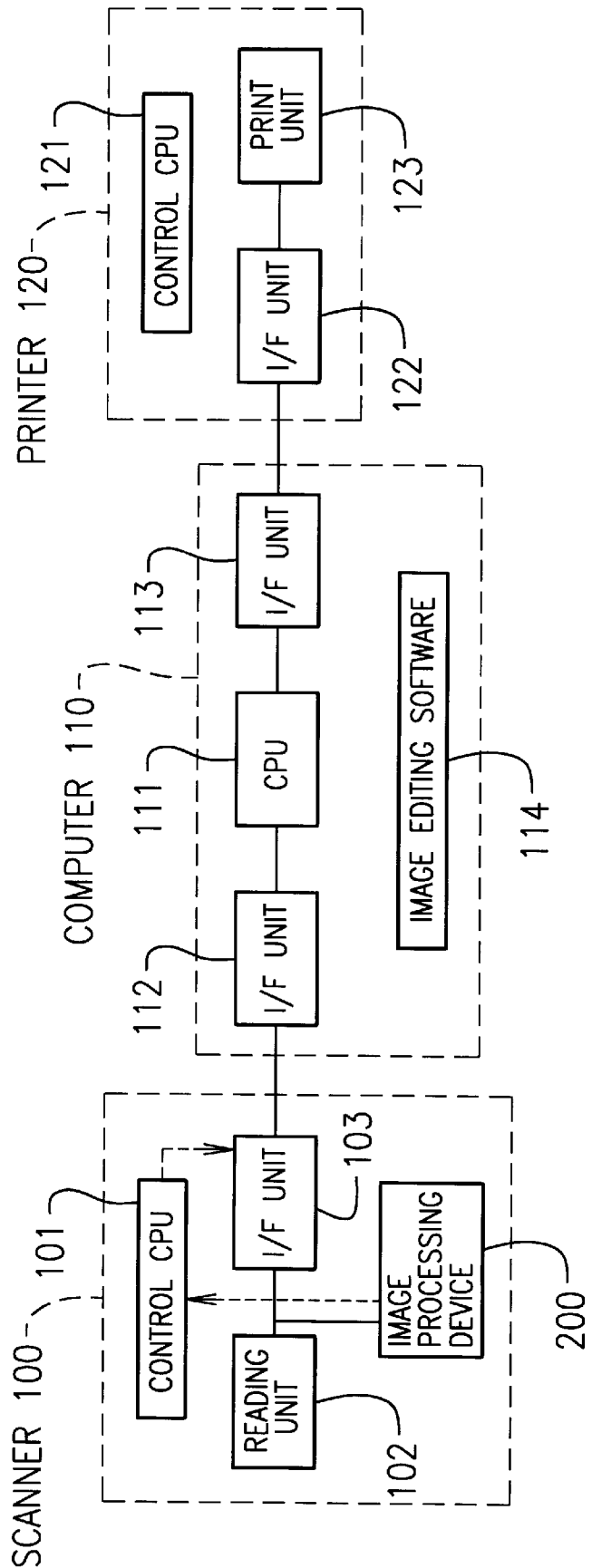
FIG. 23 is a block diagram of an image reproduction system consisting of a scanner, a computer and a printer in which an image processing device according to this invention is installed in the scanner.
Figure 24:
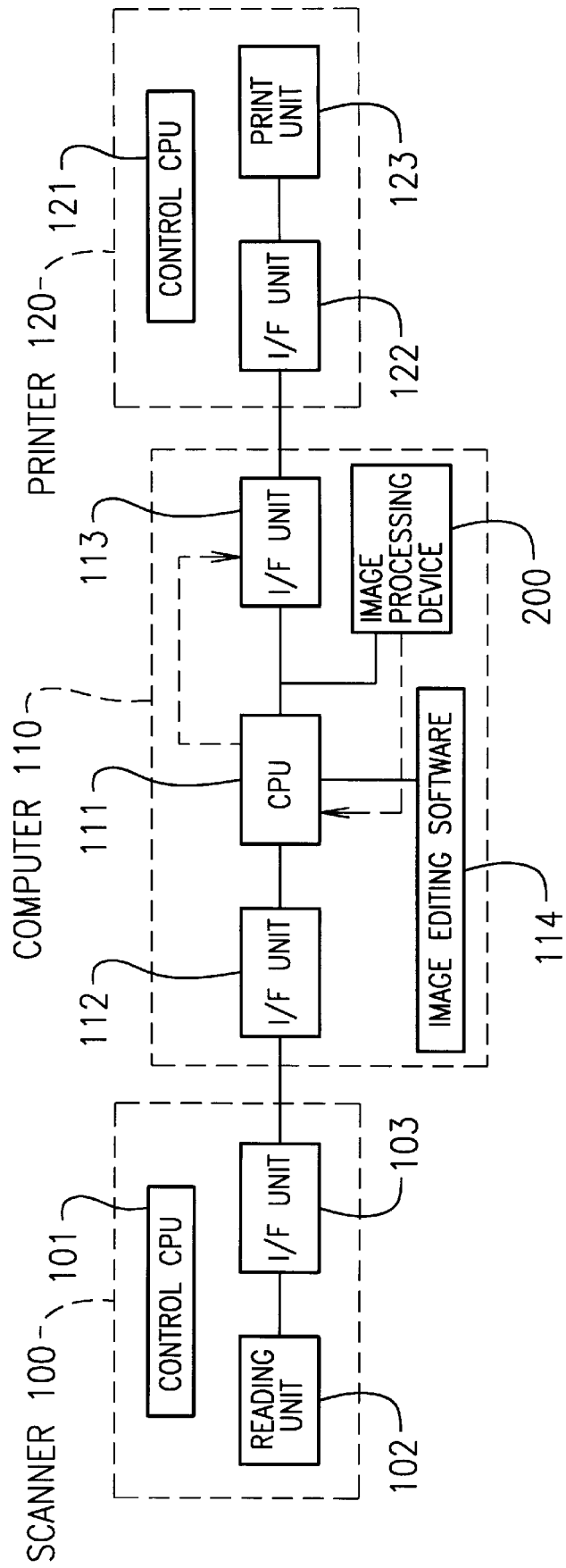
FIG. 24 is a block diagram of an image reproduction system consisting of a scanner, a computer and a printer in which an image processing device according to this invention is installed in the computer.
Figure 25:
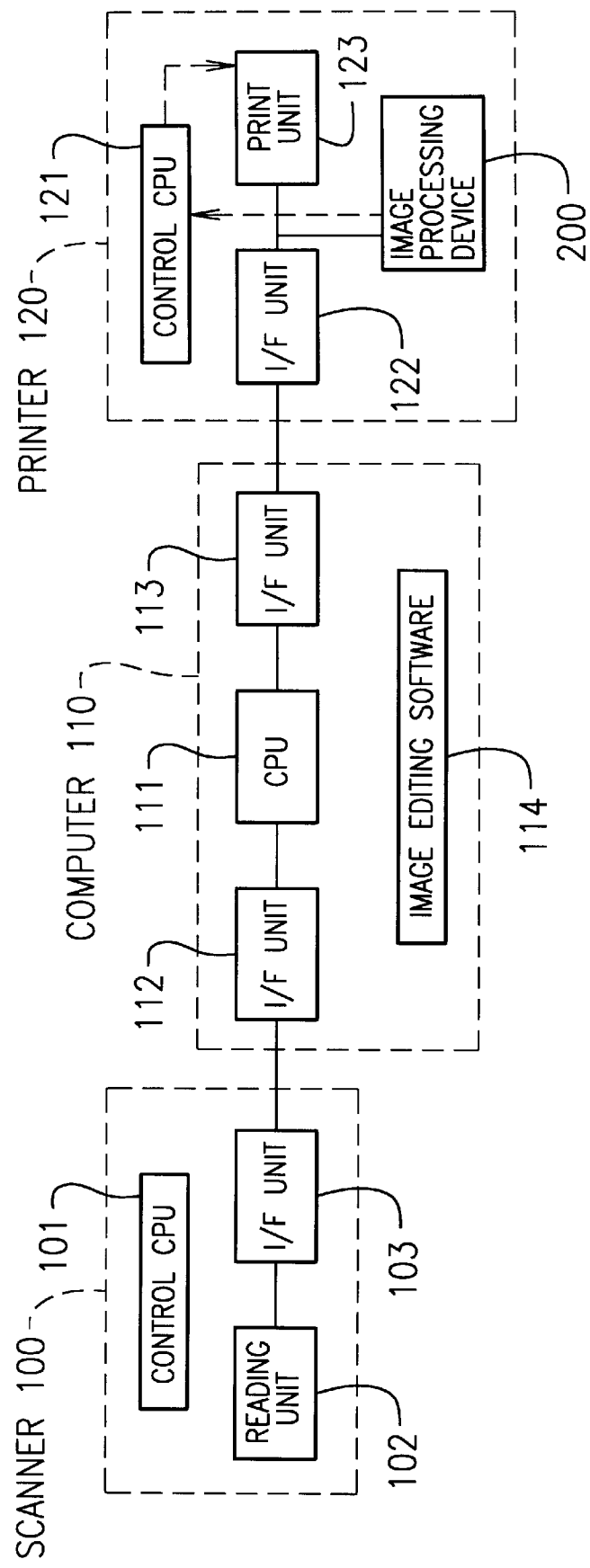
FIG. 25 is a block diagram of an image reproduction system consisting of a scanner, a computer and a printer in which an image processing device according to this invention is installed in the printer.

As the examples in FIGS. 23 through 25 show, counterfeiting of this sort can be prevented by installing an image processing device 200 designed according to this invention to generate data indicating the probability that counterfeiting is being attempted.

In the example in FIG. 23, counterfeiting is prevented by an image processing device 200 which is installed in scanner 100. The probability data output by processing device 200 are transmitted to Control CPU 101 in scanner 100. CPU 101 uses these data to judge the probability that a counterfeiting attempt is occurring. If it concludes that counterfeiting is being attempted, it outputs a "modify image" command to interface unit 103. In response to this command, interface unit 103 modifies the image in a specified way (turning it all black or reducing it) before sending it to computer 110. The resulting copy printed by printer 120 will not be able to pass as an original.

In the example in FIG. 24, counterfeiting is prevented by an image processing device 200 which is installed in computer 110. The probability data output by processing device 200 are transmitted to CPU 111 in computer 110. CPU 111 uses these data to judge the probability that a counterfeiting attempt is occurring. If it concludes that counterfeiting is being attempted, it outputs a "modify image" command to interface unit 113. In response to this command, interface unit 113 modifies the image in a specified way (turning it all black or reducing it) before sending it to printer 120. The resulting copy printed by printer 120 will not be able to pass as an original.

In the example in FIG. 25, counterfeiting is prevented by an image processing device 200 which is installed in printer 120. The probability data output by processing device 200 are transmitted to CPU 121 in printer 120. CPU 121 uses these data to judge the probability that a counterfeiting attempt is occurring. If it concludes that counterfeiting is being attempted, it outputs a "modify image" command to print unit 123. In response to this command, print unit 123 executes processing to modify the image (turning it all black or reducing it). The resulting copy printed by printer 120 will not be able to pass as an original.

Figure 26:
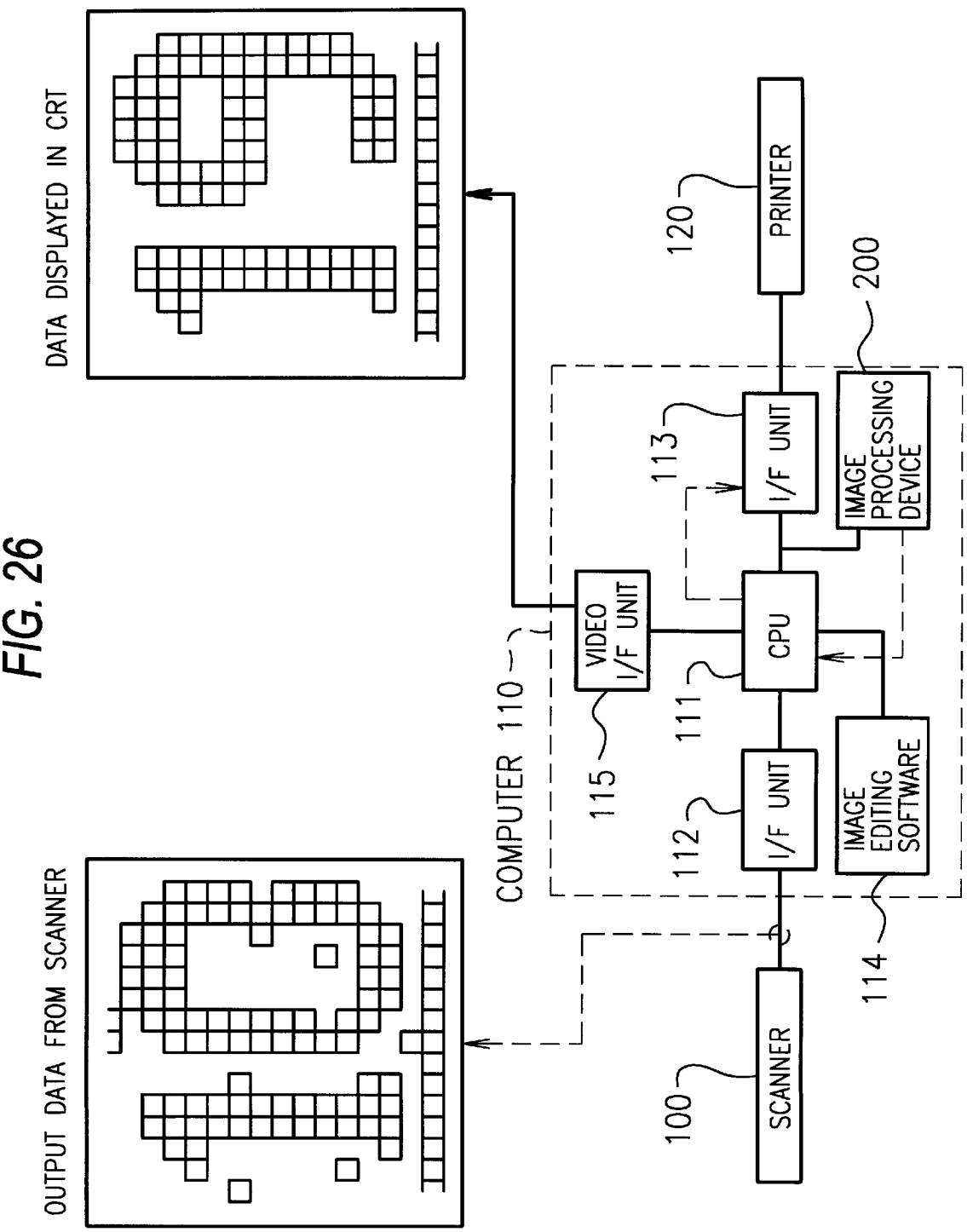
FIG. 26 is a block diagram illustrating the operation of an image reproduction system consisting of a scanner, a computer and a printer in which an image processing device according to this invention is installed in the computer.

Of all these examples, the ones shown in FIGS. 24 and 25 are most effective against counterfeiting which entails the use of image editing software. With such a system, as shown in FIG. 26, the would-be counterfeiter can leave the original document intact but alter the image of it which appears on the CRT by using editing software 114. In this example, however, the edited image data are checked to judge counterfeiting probability before being sent to printer 120. Even if the image data displayed on the CRT screen by way of video interface unit 115 have been altered, the altered image data will not be printed in normal fashion by printer 120. This will obviate the possibility that the printed copy will be used for unlawful purposes.

For a fax machine, image processing device 200 can be installed just as it is in scanner 100 in FIG. 23, and the image data to be transmitted can be processed appropriately (to turn the entire image black or reduce it). In this case, normal image data will not be sent to the remote fax machine or the printer connected to a computer. This will obviate the possibility that the printed copy will be used for unlawful purposes.

It would also be possible for the first fax machine to send unmodified image data with the probability data attached, and have the other device modify the image.

As the discussion above makes clear, this invention entails matching a pattern found in received image data against a reference pattern to generate counterfeit probability data representing the probability that a counterfeiting attempt is occurring. The received data are compared not only to the pattern which identifies a non-reproducible document, but also to an altered version of that pattern. Even if the identifying pattern is intentionally altered, then, the data indicating the probability of counterfeiting will not be affected.

Four types of probability data may be used: the goodness of fit vis-à-vis the reference patterns; the results of sorting these goodness of fit values; the results obtained by fitting the sorted goodness of fit values into an algorithm to judge probability and solving that algorithm; and the results of sorting the goodness of fit values using multiple-valued logic or the results obtained by fitting these sorted values into an algorithm to judge probability and solving that algorithm.

Three types of reference patterns are used: the pattern which identifies a non-reproducible document, an altered version of that pattern and a pattern unique to an ordinary reproducible document. The probability data can be augmented by including the fact that the received image data contains more than one or more than a certain number of unaltered or altered patterns whose goodness of fit exceeds a given value. This will insure that the probability data are well-suited to the device treating them and that they are as reliable as possible.

This invention will make the system in which it is installed (the copy machine, printer, fax machine or scanner) able to prevent counterfeiting by itself. When it is used in a scanner or fax machine the probability data can be appended to the image data which are transmitted. When the computer or printer at a later stage performs the necessary processing, it will be able to prevent counterfeiting.

What is claimed is:

1. A counterfeit detecting method to generate a counterfeit probability data representing a probability that an attempt is being made to counterfeit a document, comprising the steps of:

comparing an input image pattern of a document with a characteristic pattern peculiar to a non-reproducible image of a document which may not be reproduced to generate a first comparison data with respect to said characteristic pattern peculiar to a non-reproducible image; and comparing said input image pattern with a set of altered patterns which correspond to a set of results of tampering with said non-reproducible image to generate a second comparison data with respect to said altered patterns, said set of altered patterns is within a range of alterations which cannot fool an electrical eye but do not arouse suspicion when viewed by a human eye, wherein said first comparison data and said second comparison data are used to determine said counterfeit probability data and wherein said counterfeit probability data is obtained by plugging into a specified algorithm a result of sorting goodness of fit which is previously obtained by applying a predetermined threshold to goodness of fit of said input image pattern with respect to said characteristic pattern peculiar to said non-reproducible image and said set of altered patterns respectively.

2. A counterfeit detecting method to generate a counterfeit probability data according to claim 1, wherein said counterfeit probability data include goodnesses of fit of said input image pattern with respect to said characteristic pattern peculiar to said non-reproducible image and said set of altered patterns respectively.

3. A counterfeit detecting method to generate a counterfeit probability data according to claim 1, wherein said counterfeit probability data include a sorting result which is obtained by applying a predetermined threshold to goodnesses of fit of said input image pattern with respect to said characteristic pattern peculiar to said non-reproducible image and said set of altered patterns respectively.

4. A counterfeit detecting method to generate a counterfeit probability data according to claim 1, wherein said counterfeit probability data include a multiple-valued logic data which is obtained by applying a plurality of predetermined thresholds to goodnesses of fit of said input image pattern with respect to said characteristic pattern peculiar to said non-reproducible image and said set of altered patterns respectively.

5. A counterfeit detecting method to generate a counterfeit probability data according to claim 1, wherein said counterfeit probability data include a multiple-valued logic data which is obtained by applying a predetermined algorithm to a sorting result which is previously obtained by applying a plurality of predetermined threshold to goodnesses of fit of said input image pattern with respect to said characteristic pattern peculiar to said non-reproducible image and said set of altered patterns respectively.

6. A counterfeit detecting method to generate a counterfeit probability data according to claim 1, further comprising a step of comparing said input image pattern with a set of characteristic patterns peculiar to reproducible images found on documents which may be reproduced to generate a third comparison data with respect to said reproducible images, wherein said third comparison data is used to determine said counterfeit probability data.

7. A counterfeit detecting method to generate a counterfeit probability data according to claim 1, wherein said counterfeit probability data includes a numerical data indicating how many patterns whose goodness of fit with respect to said characteristic pattern peculiar to said non-reproducible image and said set of altered patterns respectively is more than predetermined value.

8. A counterfeit detecting method to generate a counterfeit probability data according to claim 1, wherein said counterfeit probability data includes an information indicating if said input image data has more than predetermined number of patterns whose goodness of fit with respect to said characteristic pattern peculiar to said non-reproducible image and said set of altered patterns respectively is more than predetermined value.

9. A counterfeit detecting device to generate a counterfeit probability data representing a probability that an attempt is being made to counterfeit a document, comprising:

a pattern detection device to detect a position of an input image pattern of a document and generate a position data;

a pattern extraction device to extract said input image pattern based on said position data; and a pattern matching device to match said input image pattern with a characteristic pattern peculiar to a non-reproducible image of a document which may not be reproduced to generate a first comparison data with respect to said characteristic pattern peculiar to a non-reproducible image, and a set of altered patterns which correspond to a set of results of tampering with said non-reproducible image to generate a second comparison data with respect to said altered patterns, said set of altered patterns is within a range of alterations which cannot fool an electrical eye but do not arouse suspicion when viewed by a human eye, wherein said first comparison data and said second comparison data are used to determine said counterfeit probability data and wherein said counterfeit probability data is obtained by plugging into a specified algorithm a result of sorting goodness of fit which is previously obtained by applying a predetermined threshold to goodness of fit of said input image pattern with respect to said characteristic pattern peculiar to said non-reproducible image and said set of altered patterns respectively.

10. A counterfeit detecting device to generate a counterfeit probability data according to claim 9, wherein said counterfeit probability data include goodnesses of fit of said input image pattern with respect to said characteristic pattern peculiar to said non-reproducible image and said set of altered patterns respectively.

11. A counterfeit detecting device to generate a counterfeit probability data according to claim 9, wherein said counterfeit probability data include a sorting result which is obtained by applying a predetermined threshold to goodnesses of fit of said input image pattern with respect to said characteristic pattern peculiar to said non-reproducible image and said set of altered patterns respectively.

12. A counterfeit detecting device to generate a counterfeit probability data according to claim 9, wherein said counterfeit probability data include a multiple-valued logic data which is obtained by applying a plurality of predetermined thresholds to goodnesses of fit of said input image pattern with respect to said characteristic pattern peculiar to said non-reproducible image and said set of altered patterns respectively.

13. A counterfeit detecting device to generate a counterfeit probability data according to claim 9, wherein said counterfeit probability data include a multiple-valued logic data which is obtained by applying a predetermined algorithm to a sorting result which is previously obtained by applying a plurality of predetermined threshold to goodnesses of fit of said input image pattern with respect to said characteristic pattern peculiar to said non-reproducible image and said set of altered patterns respectively.

14. A counterfeit detecting device to generate a counterfeit probability data according to claim 9, wherein said pattern matching device further matches said input image pattern with a set of characteristic patterns peculiar to reproducible images found on documents which may be reproduced to generate a third comparison data with respect to said characteristic pattern peculiar to a reproducible image, wherein said third comparison data is used to determine said counterfeit probability data.

15. A counterfeit detecting device to generate a counterfeit probability data according to claim 9, wherein said counterfeit probability data includes a numerical data indicating how many patterns whose goodness of fit with respect to said characteristic pattern peculiar to said non-reproducible image and said set of altered patterns respectively is more than predetermined value.

16. A counterfeit detecting device to generate a counterfeit probability data according to claim 9, wherein said counterfeit probability data includes an information indicating if said input image data has more than predetermined number of patterns whose goodness of fit with respect to said characteristic pattern peculiar to said non-reproducible image and said set of altered patterns respectively is more than predetermined value.

17. A copy machine having a function to prevent the counterfeiting of documents by copying which may not be legally reproduced, comprising:
   a counterfeit detecting device to generate a counterfeit probability data representing a probability that an attempt is being made to counterfeit a document, comprising:
      a pattern detection device to detect a position of an input image pattern of a document and generate a position data,
      a pattern extraction device to extract said input image pattern based on said position data, and
      a pattern matching device to match said input image pattern with a characteristic pattern peculiar to a non-reproducible image of a document which may not be reproduced to generate a first comparison data with respect to said characteristic pattern peculiar to a non-reproducible image, and a set of altered patterns which correspond to a set of results of tampering with said non-reproducible image to generate a second comparison data with respect to said altered patterns, said set of altered patterns is within a range of alterations which cannot fool an electrical eye but do not arouse suspicion when viewed by a human eye, wherein said first comparison data and said second comparison data are used to determine said counterfeit probability data; and
   a control unit to control a copying output based on said counterfeit probability data and wherein said counterfeit probability data is obtained by plugging into a specified algorithm a result of sorting goodness of fit which is previously obtained by applying a predetermined threshold to goodness of fit of said input image pattern with respect to said characteristic pattern peculiar to said non-reproducible image and said set of altered patterns respectively.

18. A printer unit having a function to prevent the counterfeiting of documents by printing which may not be legally reproduced, comprising:
   a counterfeit detecting device to generate a counterfeit probability data representing a probability that an attempt is being made to counterfeit a document, comprising:
      a pattern detection device to detect a position of an input image pattern of a document and generate a position data,
      a pattern extraction device to extract said input image pattern based on said position data, and
      a pattern matching device to match said input image pattern with a characteristic pattern peculiar to a non-reproducible image of a document which may not be reproduced to generate a first comparison data with respect to said characteristic pattern peculiar to a non-reproducible image, and a set of altered patterns which correspond to a set of results of tampering with said non-reproducible image to generate a second comparison data with respect to said altered patterns, said set of altered patterns is within a range of alterations which cannot fool an electrical eye but do not arouse suspicion when viewed by a human eye, wherein said first comparison data and said second comparison data are used to determine said counterfeit probability data; and
   a control unit to control a printing output based on said counterfeit probability data and wherein said counterfeit probability data is obtained by plugging into a specified algorithm a result of sorting goodness of fit which is previously obtained by applying a predetermined threshold to goodness of fit of said input image pattern with respect to said characteristic pattern peculiar to said non-reproducible image and said set of altered patterns respectively.

19. A facsimile machine having a function to prevent the counterfeiting of documents by facsimile which may not be legally reproduced, comprising:
   a counterfeit detecting device to generate a counterfeit probability data representing a probability that an attempt is being made to counterfeit a document, comprising:
      a pattern detection device to detect a position of an input image pattern of a document and generate a position data,
      a pattern extraction device to extract said input image pattern based on said position data, and
      a pattern matching device to match said input image pattern with a characteristic pattern peculiar to a non-reproducible image of a document which may not be reproduced to generate a first comparison data with respect to said characteristic pattern peculiar to a non-reproducible image, and a set of altered patterns which correspond to a set of results of tampering with said non-reproducible image to generate a second comparison data with respect to said altered patterns, said set of altered patterns is within a range of alterations which cannot fool an electrical eye but do not arouse suspicion when viewed by a human eye, wherein said first comparison data and said second comparison data are used to determine said counterfeit probability data; and a control unit to control a facsimile output based on said counterfeit probability data and wherein said counterfeit probability data is obtained by plugging into a specified algorithm a result of sorting goodness of fit which is previously obtained by applying a predetermined threshold to goodness of fit of said input image pattern with respect to said characteristic pattern peculiar to said non-reproducible image and said set of altered patterns respectively.

20. A scanner having a function to prevent the counterfeiting of documents by scanning which may not be legally reproduced, comprising:

a counterfeit detecting device to generate a counterfeit probability data representing a probability that an attempt is being made to counterfeit a document, comprising:

a pattern detection device to detect a position of an input image pattern of a document and generate a position data, a pattern extraction device to extract said input image pattern based on said position data, and a pattern matching device to match said input image pattern with a characteristic pattern peculiar to a non-reproducible image of a document which may not be reproduced to generate a first comparison data with respect to said characteristic pattern peculiar to a non-reproducible image, and a set of altered patterns which correspond to a set of results of tampering with said non-reproducible image to generate a second comparison data with respect to said altered patterns, said set of altered patterns is within a range of alterations which cannot fool an electrical eye but do not arouse suspicion when viewed by a human eye, wherein said first comparison data and said second comparison data are used to determine said counterfeit probability data; and a control unit to control a scanning output based on said counterfeit probability data and wherein said counterfeit probability data is obtained by plugging into a specified algorithm a result of sorting goodness of fit which is previously obtained by applying a predetermined threshold to goodness of fit of said input image pattern with respect to said characteristic pattern peculiar to said non-reproducible image and said set of altered patterns respectively.

* * * * *